United States Patent
Janedula et al.

(10) Patent No.: US 10,990,648 B2
(45) Date of Patent: Apr. 27, 2021

(54) SYSTEM AND METHOD FOR AN OPTIMIZED WINOGRAD CONVOLUTION ACCELERATOR

(71) Applicant: Intel Corporation, Santa Clara, CA (US)

(72) Inventors: Pradeep Janedula, Bangalore (IN);
Bijoy Pazhanimala, Bangalore (IN);
Bharat Daga, Bangalore (IN); Saurabh Dhoble, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 842 days.

(21) Appl. No.: 15/670,359

(22) Filed: Aug. 7, 2017

(65) Prior Publication Data
US 2019/0042923 A1    Feb. 7, 2019

(51) Int. Cl.
*G06F 17/15* (2006.01)
*G06F 17/16* (2006.01)

(52) U.S. Cl.
CPC ............. *G06F 17/15* (2013.01); *G06F 17/16* (2013.01)

(58) Field of Classification Search
CPC .. G06N 3/02; G06N 3/04; G06N 3/06; G06N 3/063; G06N 3/08; G06N 20/00; G06F 17/15; G06F 17/153; G06F 17/16
See application file for complete search history.

(56) References Cited

U.S. PATENT DOCUMENTS

| | | | | |
|---|---|---|---|---|
| 2017/0344876 A1* | 11/2017 | Brothers | ............ | G06N 3/0454 |
| 2018/0349317 A1* | 12/2018 | Deng | ............ | G06N 3/0454 |
| 2019/0080239 A1* | 3/2019 | Yang | ............ | G06N 3/0445 |
| 2020/0019851 A1* | 1/2020 | Mehrabian | ............ | G06N 3/067 |
| 2020/0134400 A1* | 4/2020 | Liu | ............ | G06K 9/66 |

FOREIGN PATENT DOCUMENTS

| | | | |
|---|---|---|---|
| CN | 109388777 A | | 2/2019 |
| CN | 110533164 A | * | 12/2019 |
| DE | 102018119225 A | | 2/2019 |

OTHER PUBLICATIONS

Di Huang et al., "DWM: A Decomposable Winograd Method for Convolution Acceleration", arXiv:2002.00552v1, Feb. 2020 (Year: 2020).*

* cited by examiner

*Primary Examiner* — Matthew D Sandifer
(74) *Attorney, Agent, or Firm* — Jaffery Watson Mendonsa & Hamilton LLP

(57) ABSTRACT

One embodiment provides a compute apparatus to perform machine learning operations, the compute apparatus comprising a hardware accelerator including a compute unit to perform a Winograd convolution, the compute unit configurable to perform the Winograd convolution for a first kernel size using a transform associated with a second kernel size.

18 Claims, 31 Drawing Sheets

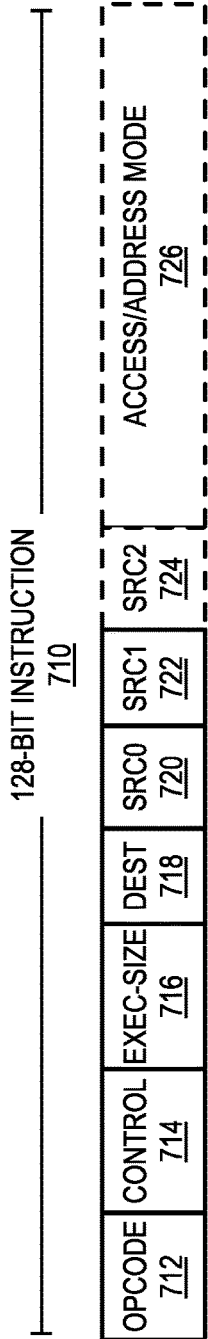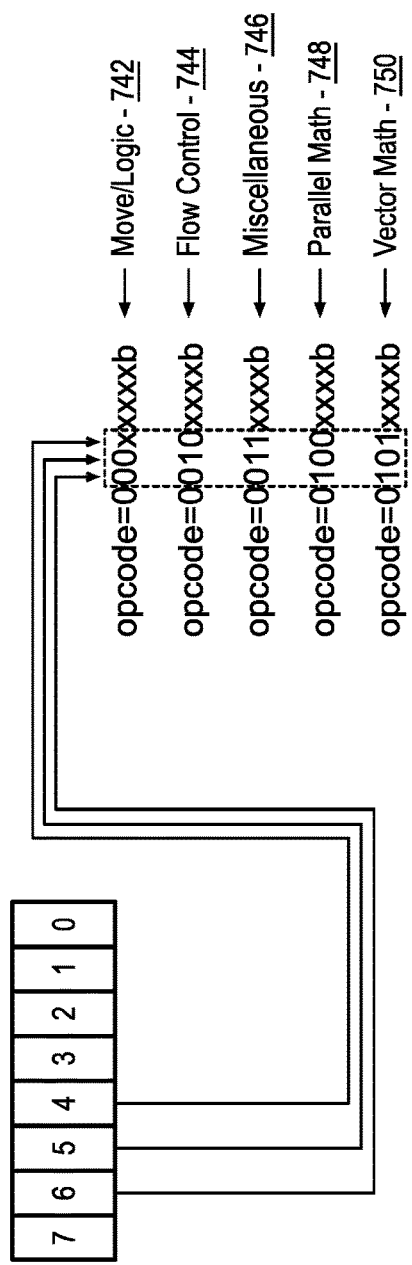
FIG. 7

FIG. 9A    GRAPHICS PROCESSOR COMMAND FORMAT
900
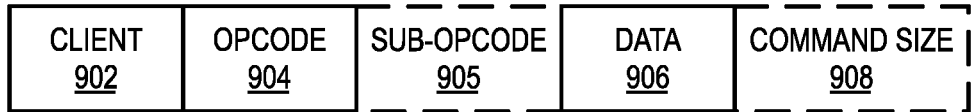
FIG. 9B    GRAPHICS PROCESSOR COMMAND SEQUENCE
910
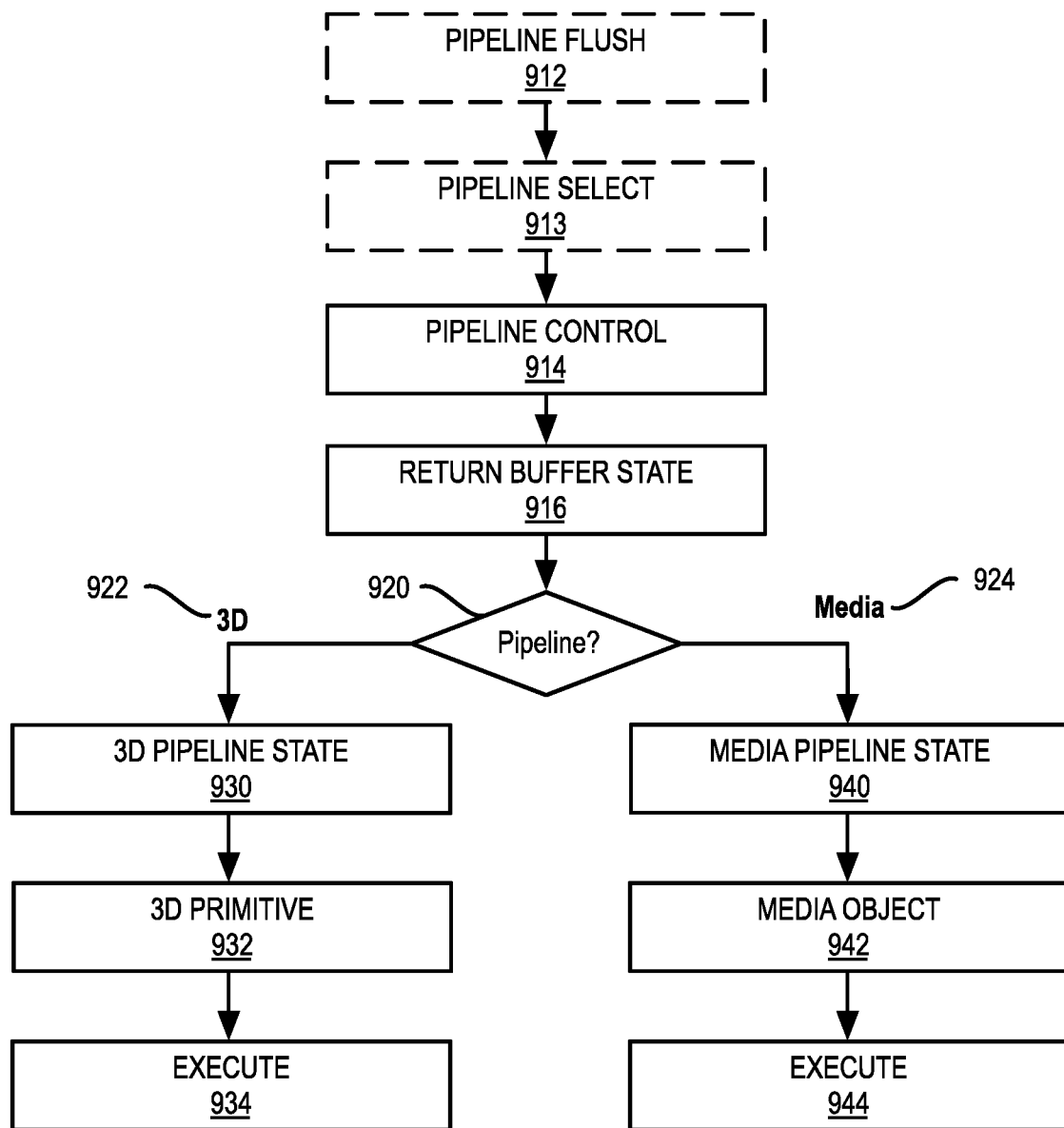

SYSTEM AND METHOD FOR AN OPTIMIZED WINOGRAD CONVOLUTION ACCELERATOR

FIELD

Embodiments relate generally to data processing and more particularly to machine learning processing via a general-purpose graphics processing unit.

BACKGROUND OF THE DESCRIPTION

Machine learning has been successful at solving many kinds of tasks. The computations that arise when training and using machine learning algorithms (e.g., neural networks) lend themselves naturally to efficient parallel implementations. Accordingly, parallel processors such as general-purpose graphic processing units (GPGPUs) have played a significant role in the practical implementation of deep neural networks. However, plementing deep learning based machine learning systems can require a large amount of memory and computing power. Deep learning neural network models can be many megabytes in size and require billions of floating-point operations per second to efficiently process. Such requirements can prevent the deployment of many neural network models to low power computing devices, such as devices suitable for use within the Internet of Things (IoT) application domain, which generally consists of low-end embedded devices

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope.

FIG. 7 is a block diagram illustrating a graphics processor instruction formats according to some embodiments;

FIG. 9A-9B illustrate a graphics processor command format and command sequence, according to some embodiments;

DETAILED DESCRIPTION

In some embodiments, a graphics processing unit (GPU) is communicatively coupled to host/processor cores to accelerate graphics operations, machine-learning operations, pattern analysis operations, and various general-purpose GPU (GPGPU) functions. The GPU may be communicatively coupled to the host processor/cores over a bus or another interconnect. In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

In the description that follows, FIGS. 1-14 provide an overview of exemplary data processing system and graphics processor logic that incorporates or relates to the various embodiments. FIGS. 15-26 provide specific details of the various embodiments. FIGS. 27-31 provide an overview of machine learning hardware and software architecture. Some aspects of the following embodiments are described with reference to a graphics processor, while other aspects are described with respect to a general-purpose processor, such as a central processing unit (CPU). Similar techniques and teachings can be applied to other types of circuits or semiconductor devices, including but not limited to a many integrated core processor, a GPU cluster, or one or more instances of a field programmable gate array (FPGA). In general, the teachings are applicable to any processor or machine that manipulates or processes image (e.g., sample, pixel), vertex data, or geometry data. The embodiments described herein may be practiced without one or more of the specific details provided herein. In some instances, well-known features have not been described to avoid obscuring the details of the present embodiments.

System Overview

Figure 1:
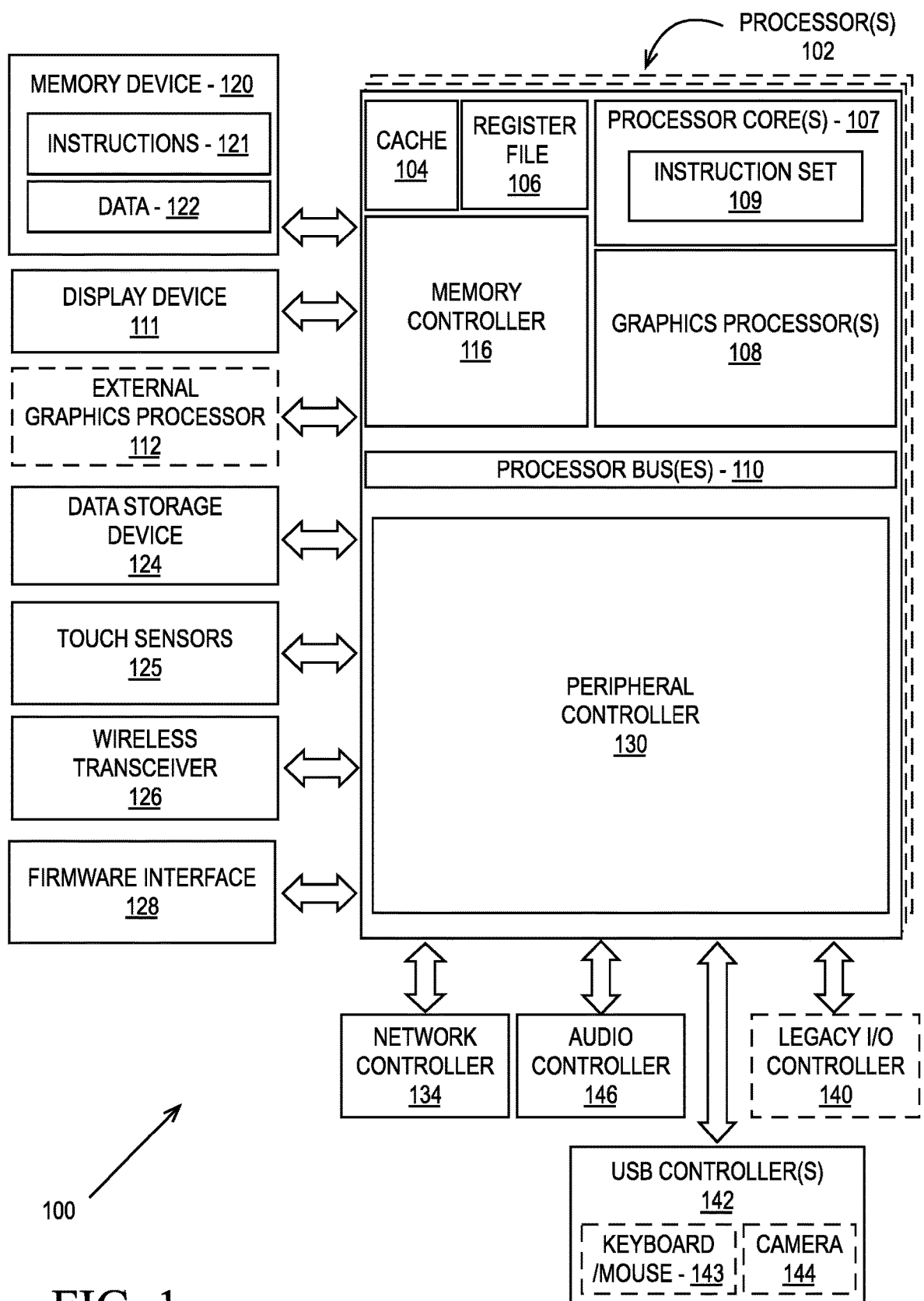
FIG. 1 is a block diagram of a processing system, according to an embodiment.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

In one embodiment the system 100 can include, or be incorporated within a server-based gaming platform, a game console, including a game and media console, a mobile gaming console, a handheld game console, or an online game console. In some embodiments the system 100 is a mobile phone, smart phone, tablet computing device or mobile Internet device. The processing system 100 can also include, couple with, or be integrated within a wearable device, such as a smart watch wearable device, smart eyewear device, augmented reality device, or virtual reality device. In some embodiments, the processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with a processor bus 110 to transmit communication signals such as address, data, or control signals between processor 102 and other components in the system 100. The processor bus 110, in one embodiment, is a version of the Direct Media Interface (DMI) bus. In one embodiment the processor(s) 102 include an integrated memory controller 116 and a peripheral controller 130. The memory controller 116 facilitates communication between a memory device and other components of the system 100, while the peripheral controller hub (PCH) 130 provides connections to I/O devices via a local I/O bus.

The memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 112, which may communicate with the one or more graphics processors 108 in processors 102 to perform graphics and media operations. In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the peripheral controller 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., hard disk drive, flash memory, etc.). The data storage device 124 can connect via a storage interface (e.g., SATA) or via a peripheral bus, such as a Peripheral Component Interconnect bus (e.g., PCI, PCI Express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, or Long Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the processor bus 110. The audio controller 146, in one embodiment, is a multi-channel high definition audio controller. In one embodiment the system 100 incudes an optional legacy I/O controller 140 for coupling legacy (e.g., Personal System 2 (PS/2)) devices to the system. The peripheral controller 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and peripheral controller 130 may be integrated into a discreet external graphics processor, such as the external graphics processor 112. In one embodiment the peripheral controller 130 and/or memory controller 1160 may be external to the one or more processor(s) 102. For example, the system 100 can include an external memory controller 116 and peripheral controller 130, which may be configured as a memory controller hub and peripheral controller hub within a system chipset that is in communication with the processor(s) 102.

Figure 2:
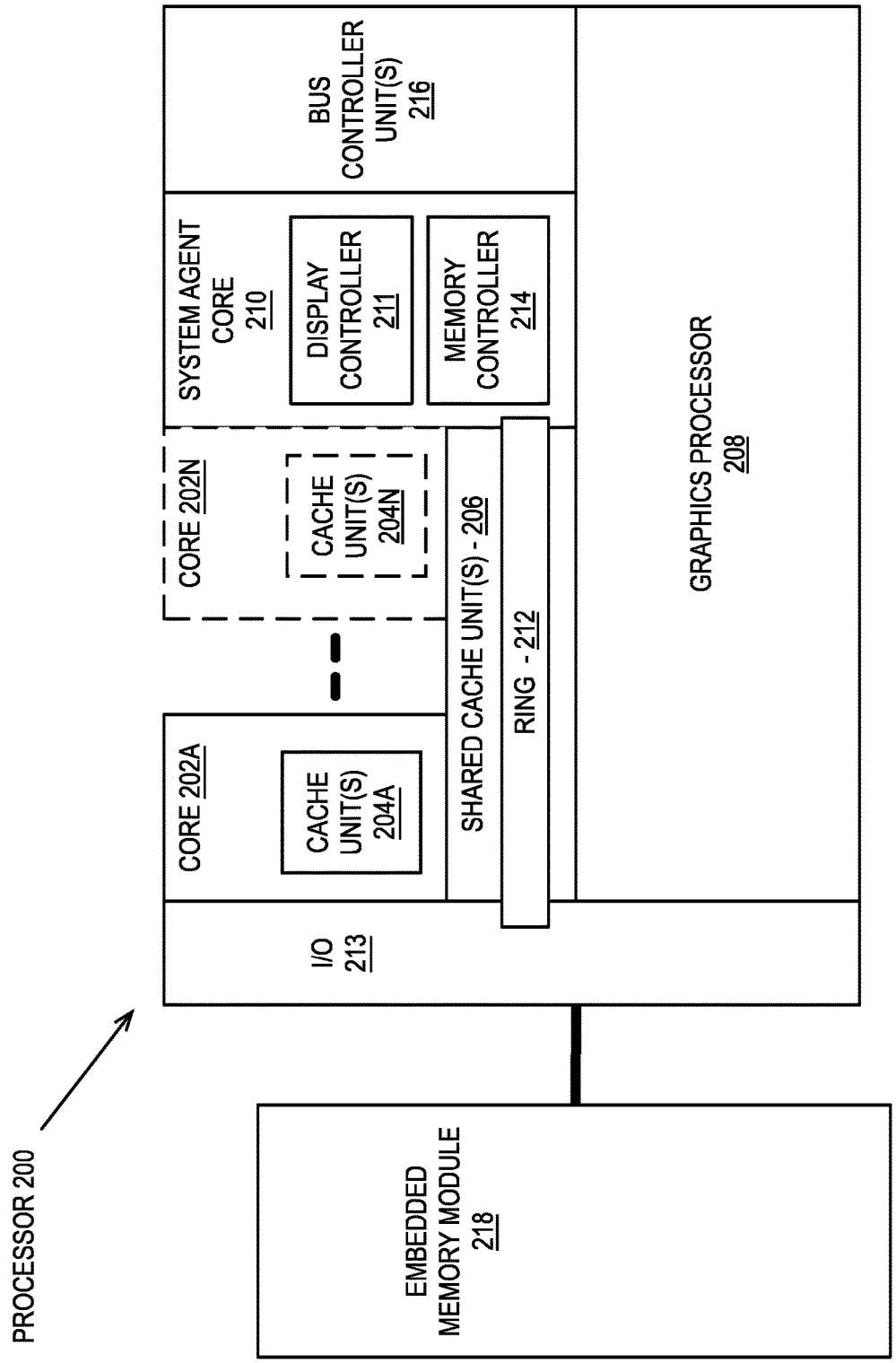
FIG. 2 is a block diagram of a processor according to an embodiment.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
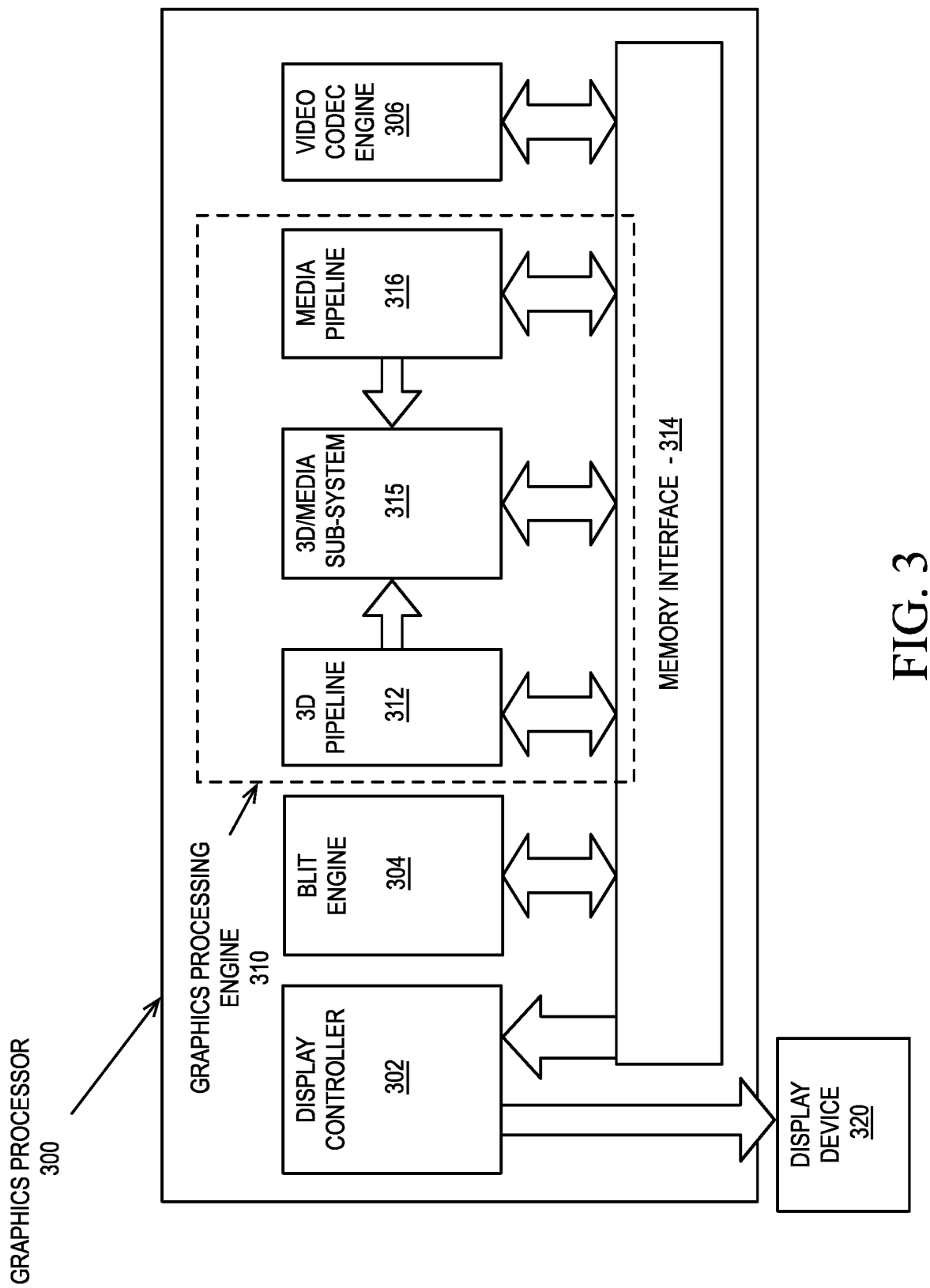
FIG. 3 is a block diagram of a graphics processor, according to an embodiment.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. The display device 320 can be an internal or external display device. In one embodiment the display device 320 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
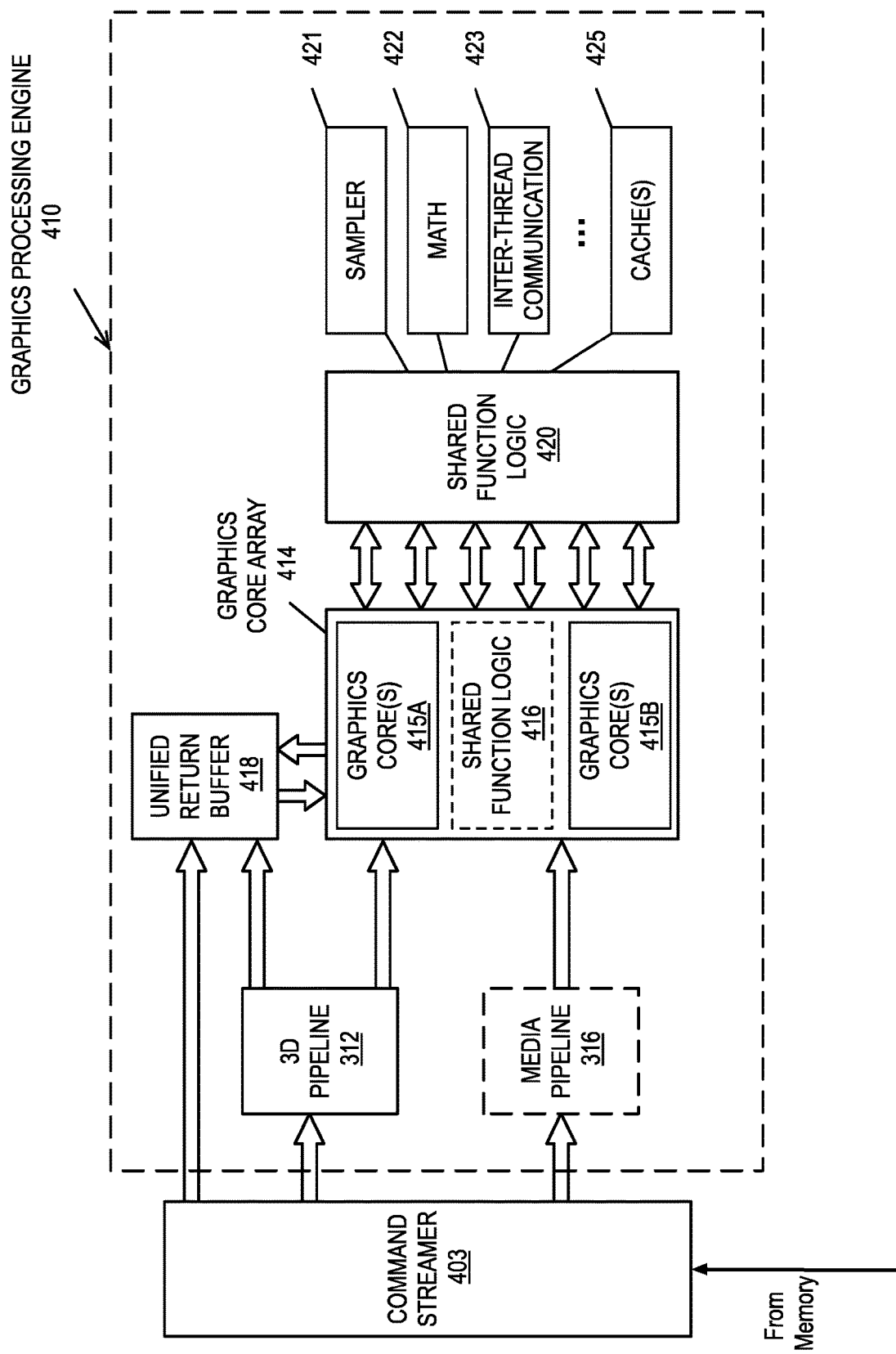
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general purpose and graphics specific execution logic to perform graphics and compute operations, as well as fixed function texture processing and/or machine learning and artificial intelligence acceleration logic.

In various embodiments the 3D pipeline 312 includes fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Figure 5:
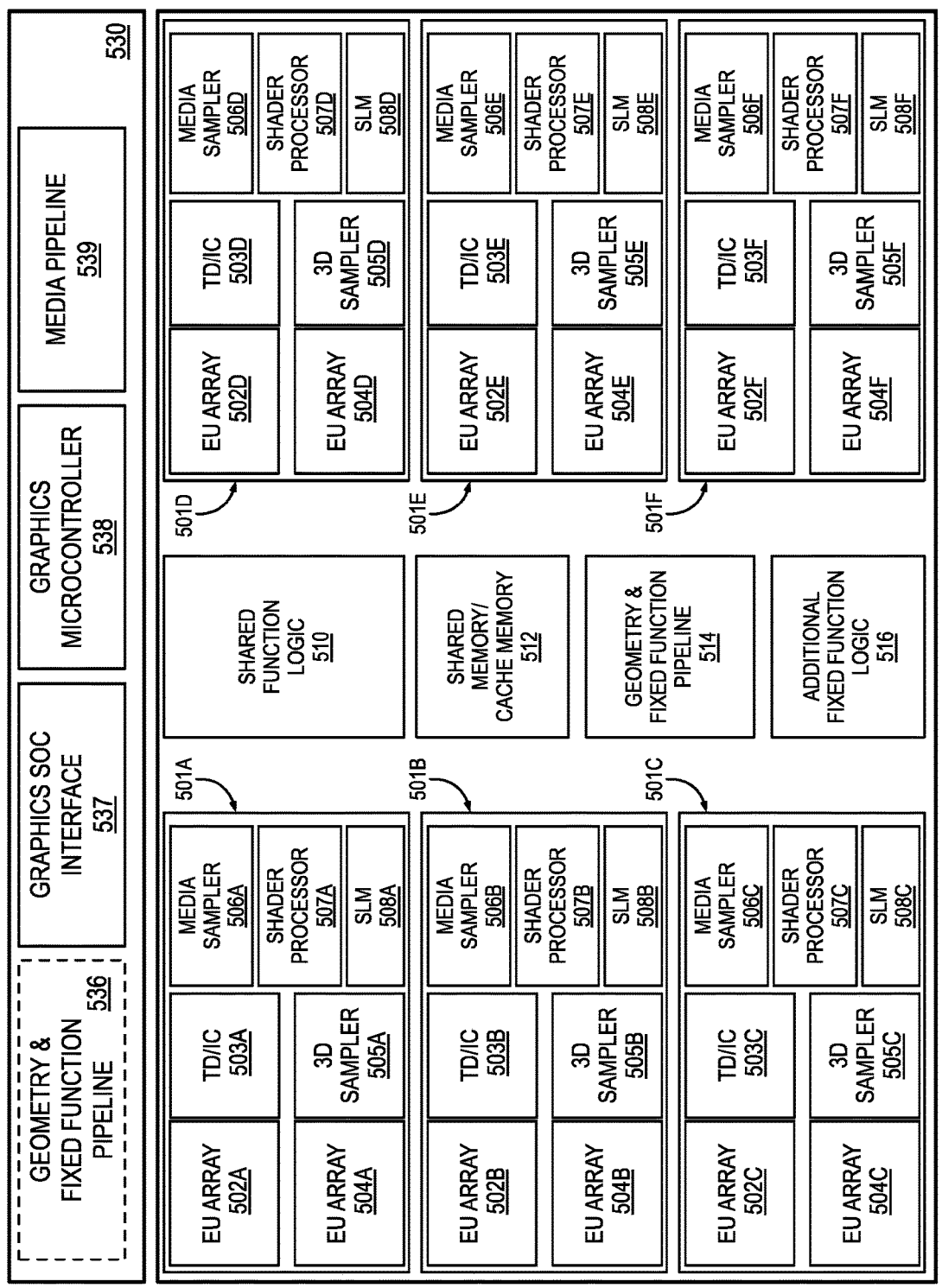
FIG. 5 is a block diagram of hardware logic of a graphics processor core, according to some embodiments described herein.

FIG. 5 is a block diagram of hardware logic of a graphics processor core 500, according to some embodiments described herein. Elements of FIG. 5 having the same reference numbers (or names) as the elements of any other figure herein can operate or function in any manner similar to that described elsewhere herein, but are not limited to such. The illustrated graphics processor core 500, in some embodiments, is included within the graphics core array 414 of FIG. 4. The graphics processor core 500, sometimes referred to as a core slice, can be one or multiple graphics cores within a modular graphics processor. The graphics processor core 500 is exemplary of one graphics core slice, and a graphics processor as described herein may include multiple graphics core slices based on target power and performance envelopes. Each graphics core 500 can include a fixed function block 530 coupled with multiple sub-cores 501A-501F, also referred to as sub-slices, that include modular blocks of general purpose and fixed function logic.

In some embodiments the fixed function block 530 includes a geometry/fixed function pipeline 536 that can be shared by all sub-cores in the graphics processor 500, for example, in lower performance and/or lower power graphics processor implementations. In various embodiments, the geometry/fixed function pipeline 536 includes a 3D fixed function pipeline (e.g., 3D pipeline 312 as in FIG. 3 and FIG. 4) a video front-end unit, a thread spawner and thread dispatcher, and a unified return buffer manager, which manages unified return buffers, such as the unified return buffer 418 of FIG. 4.

In one embodiment the fixed function block 530 also includes a graphics SoC interface 537, a graphics microcontroller 538, and a media pipeline 539. The graphics SoC interface 537 provides an interface between the graphics core 500 and other processor cores within a system on a chip integrated circuit. The graphics microcontroller 538 is a programmable sub-processor that is configurable to manage various functions of the graphics processor 500, including thread dispatch, scheduling, and pre-emption. The media pipeline 539 (e.g., media pipeline 316 of FIG. 3 and FIG. 4) includes logic to facilitate the decoding, encoding, pre-processing, and/or post-processing of multimedia data, including image and video data. The media pipeline 539 implement media operations via requests to compute or sampling logic within the sub-cores 501-501F.

In one embodiment the SoC interface 537 enables the graphics core 500 to communicate with general purpose application processor cores (e.g., CPUs) and/or other components within an SoC, including memory hierarchy elements such as a shared last level cache memory, the system RAM, and/or embedded on-chip or on-package DRAM. The SoC interface 537 can also enable communication with fixed function devices within the SoC, such as camera imaging pipelines, and enables the use of and/or implements global memory atomics that may be shared between the graphics core 500 and CPUs within the SoC. The SoC interface 537 can also implement power management controls for the graphics core 500 and enable an interface between a clock domain of the graphic core 500 and other clock domains within the SoC. In one embodiment the SoC interface 537 enables receipt of command buffers from a command streamer and global thread dispatcher that are configured to provide commands and instructions to each of one or more graphics cores within a graphics processor. The commands and instructions can be dispatched to the media pipeline 539, when media operations are to be performed, or a geometry and fixed function pipeline (e.g., geometry and fixed function pipeline 536, geometry and fixed function pipeline 514) when graphics processing operations are to be performed.

The graphics microcontroller 538 can be configured to perform various scheduling and management tasks for the graphics core 500. In one embodiment the graphics microcontroller 538 can perform graphics and/or compute workload scheduling on the various graphics parallel engines within execution unit (EU) arrays 502A-502F, 504A-504F within the sub-cores 501A-501F. In this scheduling model, host software executing on a CPU core of an SoC including the graphics core 500 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 538 can also facilitate low-power or idle states for the graphics core 500, providing the graphics core 500 with the ability to save and restore registers within the graphics core 500 across low-power state transitions independently from the operating system and/or graphics driver software on the system.

The graphics core 500 may have greater than or fewer than the illustrated sub-cores 501A-501F, up to N modular sub-cores. For each set of N sub-cores, the graphics core 500 can also include shared function logic 510, shared and/or cache memory 512, a geometry/fixed function pipeline 514, as well as additional fixed function logic 516 to accelerate various graphics and compute processing operations. The shared function logic 510 can include logic units associated with the shared function logic 420 of FIG. 4 (e.g., sampler, math, and/or inter-thread communication logic) that can be shared by each N sub-cores within the graphics core 500. The shared and/or cache memory 512 can be a last-level cache for the set of N sub-cores 501A-501F within the graphics core 500, and can also serve as shared memory that is accessible by multiple sub-cores. The geometry/fixed function pipeline 514 can be included instead of the geometry/fixed function pipeline 536 within the fixed function block 530 and can include the same or similar logic units.

In one embodiment the graphics core 500 includes additional fixed function logic 516 that can include various fixed function acceleration logic for use by the graphics core 500. In one embodiment the additional fixed function logic 516 includes an additional geometry pipeline for use in position only shading. In position-only shading, two geometry pipelines exist, the full geometry pipeline within the geometry/fixed function pipeline 516, 536, and a cull pipeline, which is an additional geometry pipeline which may be included within the additional fixed function logic 516. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 516 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 516 can also include machine-learning acceleration logic, such as fixed function matrix multiplication logic, for implementations including optimizations for machine learning training or inferencing.

Within each graphics sub-core 501A-501F includes a set of execution resources that may be used to perform graphics, media, and compute operations in response to requests by graphics pipeline, media pipeline, or shader programs. The graphics sub-cores 501A-501F include multiple EU arrays 502A-502F, 504A-504F, thread dispatch and inter-thread communication (TD/IC) logic 503A-503F, a 3D (e.g., texture) sampler 505A-505F, a media sampler 506A-506F, a shader processor 507A-507F, and shared local memory (SLM) 508A-508F. The EU arrays 502A-502F, 504A-504F each include multiple execution units, which are general-purpose graphics processing units capable of performing floating-point and integer/fixed-point logic operations in service of a graphics, media, or compute operation, including graphics, media, or compute shader programs. The TD/IC logic 503A-503F performs local thread dispatch and thread control operations for the execution units within a sub-core and facilitate communication between threads executing on the execution units of the sub-core. The 3D sampler 505A-505F can read texture or other 3D graphics related data into memory. The 3D sampler can read texture data differently based on a configured sample state and the texture format associated with a given texture. The media sampler 506A-506F can perform similar read operations based on the type and format associated with media data. In one embodiment, each graphics sub-core 501A-501F can alternately include a unified 3D and media sampler. Threads executing on the execution units within each of the sub-cores 501A-501F can make use of shared local memory 508A-508F within each sub-core, to enable threads executing within a thread group to execute using a common pool of on-chip memory.

Execution Units

Figure 6A:
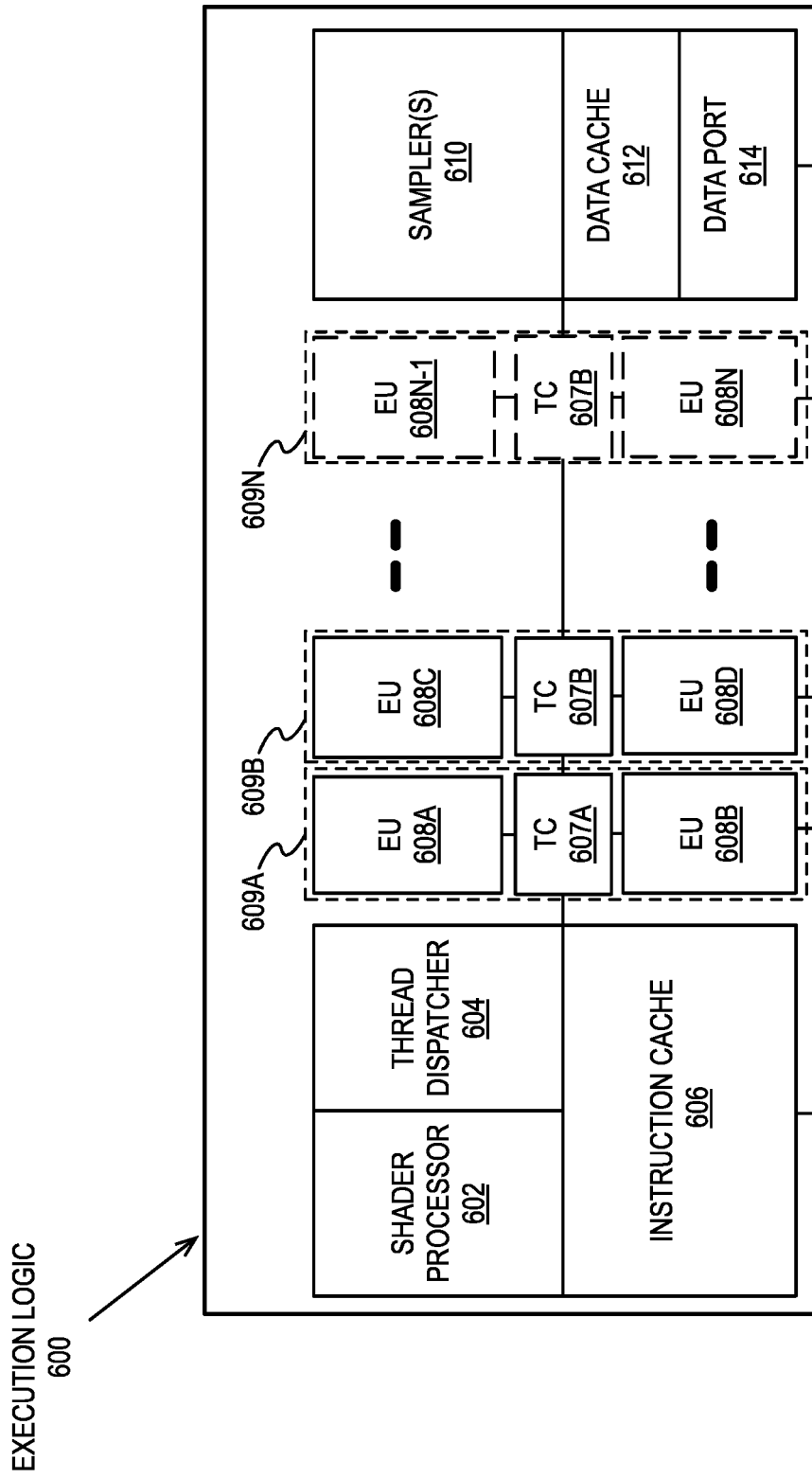
FIGS. 6A-6B illustrate thread execution logic including an array of processing elements employed in a graphics processor core according to embodiments described herein.
Figure 6B:
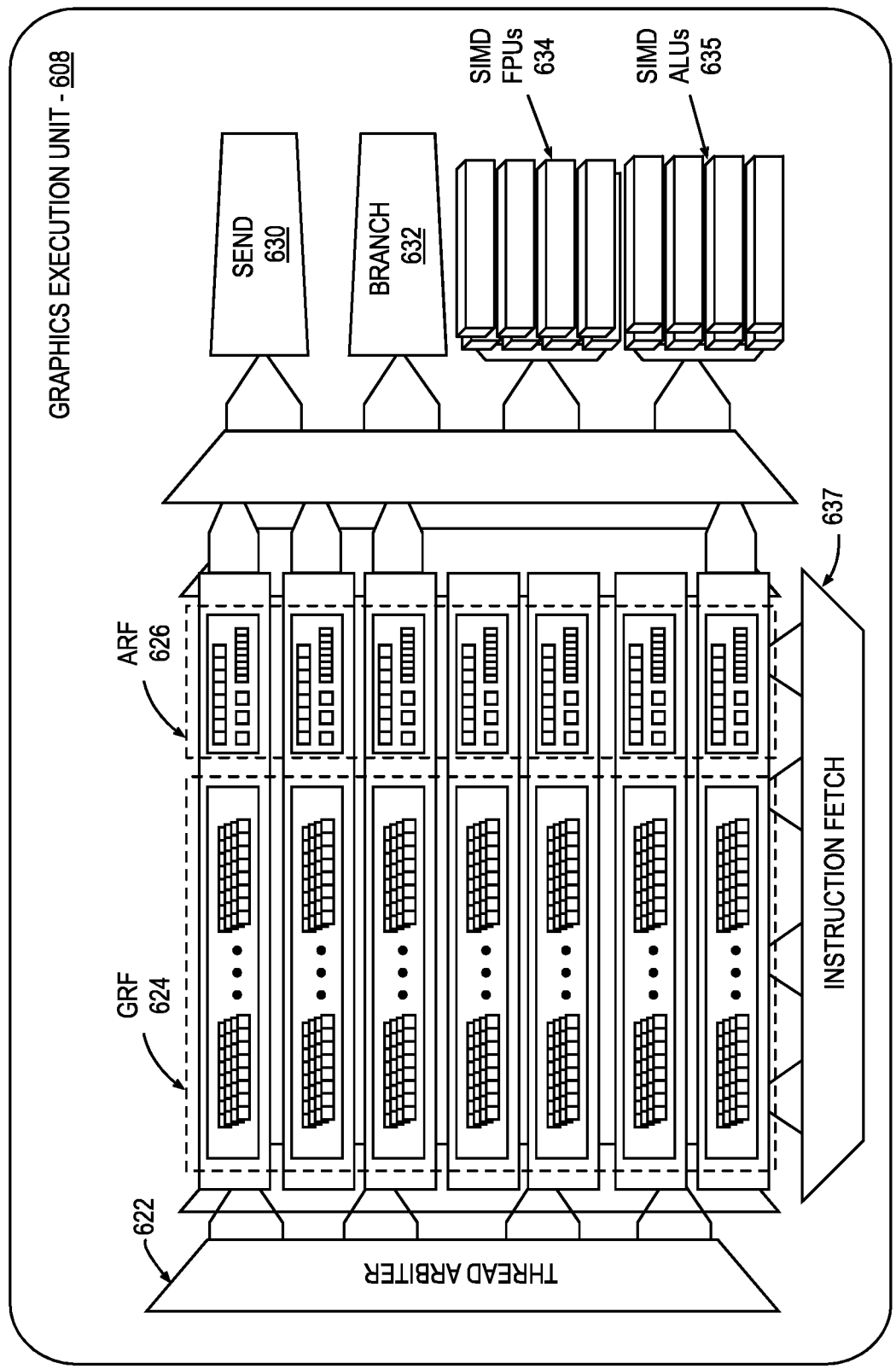

FIGS. 6A-6B illustrate thread execution logic 600 including an array of processing elements employed in a graphics processor core according to embodiments described herein. Elements of FIGS. 6A-6B having the same reference numbers (or names) as the elements of any other figure herein can operate or function in any manner similar to that described elsewhere herein, but are not limited to such. FIG. 6A illustrates an overview of thread execution logic 600, which can include a variant of the hardware logic illustrated with each sub-core 501A-501F of FIG. 5. FIG. 6B illustrates exemplary internal details of an execution unit.

As illustrated in FIG. 6A, in some embodiments thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, a geometry pipeline can dispatch vertex, tessellation, or geometry shaders to the thread execution logic for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 609A-609N having thread control logic (607A-607N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 609A-609N includes at least two execution units. For example, fused execution unit 609A includes a first EU 608A, second EU 608B, and thread control logic 607A that is common to the first EU 608A and the second EU 608B. The thread control logic 607A controls threads executed on the fused graphics execution unit 609A, allowing each EU within the fused execution units 609A-609N to execute using a common instruction pointer register.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, shader processor 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 to output processed data to memory for further processing on a graphics processor output pipeline. In some embodiments, the data port 614 includes or couples to one or more cache memories (e.g., data cache 612) to cache data for memory access via the data port.

As illustrated in FIG. 6B, a graphics execution unit 608 can include an instruction fetch unit 637, a general register file array (GRF) 624, an architectural register file array (ARF) 626, a thread arbiter 622, a send unit 630, a branch unit 632, a set of SIMD floating point units (FPUs) 634, and in one embodiment a set of dedicated integer SIMD ALUs 635. The GRF 624 and ARF 626 includes the set of general register files and architecture register files associated with each simultaneous hardware thread that may be active in the graphics execution unit 608. In one embodiment, per thread architectural state is maintained in the ARF 626, while data used during thread execution is stored in the GRF 624. The execution state of each thread, including the instruction pointers for each thread, can be held in thread-specific registers in the ARF 626.

In one embodiment the graphics execution unit 608 has an architecture that is a combination of Simultaneous Multi-Threading (SMT) and fine-grained Interleaved Multi-Threading (IMT). The architecture has a modular configuration that can be fine tuned at design time based on a target number of simultaneous threads and number of registers per execution unit, where execution unit resources are divided across logic used to execute multiple simultaneous threads.

In one embodiment, the graphics execution unit 608 can co-issue multiple instructions, which may each be different instructions. The thread arbiter 622 of the graphics execution unit thread 608 can dispatch the instructions to one of the send unit 630, branch unit 642, or SIMD FPU(s) 634 for execution. Each execution thread can access 128 general-purpose registers within the GRF 624, where each register can store 32 bytes, accessible as a SIMD8-element vector of 32-bit data elements. In one embodiment, each execution unit thread has access to 4 bytes within the GRF 624, although embodiments are not so limited, and greater or fewer register resources may be provided in other embodiments. In one embodiment up to seven threads can execute simultaneously, although the number of threads per execution unit can also vary according to embodiments. In an embodiment in which seven threads may access 4 Kbytes, the GRF 624 can store a total of 28 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 630. In one embodiment, branch instructions are dispatched to a dedicated branch unit 632 to facilitate SIMD divergence and eventual convergence.

In one embodiment the graphics execution unit 608 includes one or more SIMD floating point units (FPU(s)) 634 to perform floating-point operations. In one embodiment, the FPU(s) 634 also support integer computation. In one embodiment the FPU(s) 634 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 635 are also present, and may be specifically optimized to perform operations associated with machine learning computations.

In one embodiment, arrays of multiple instances of the graphics execution unit 608 can be instantiated in a graphics sub-core grouping (e.g., a sub-slice). For scalability, product architects can chose the exact number of execution units per sub-core grouping. In one embodiment the execution unit 608 can execute instructions across a plurality of execution channels. In a further embodiment, each thread executed on the graphics execution unit 608 is executed on a different channel.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
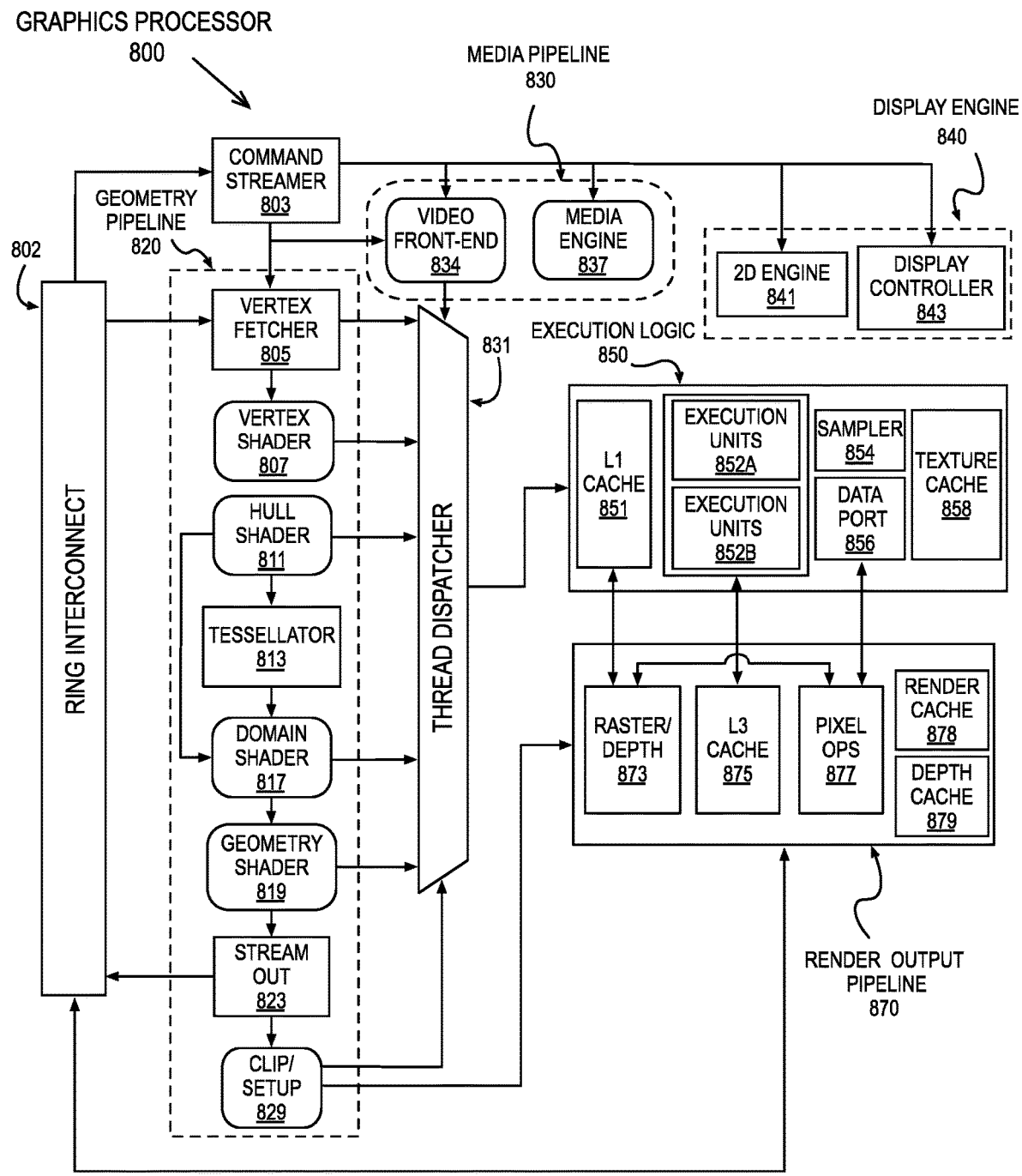
FIG. 8 is a block diagram of a graphics processor according to another embodiment.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
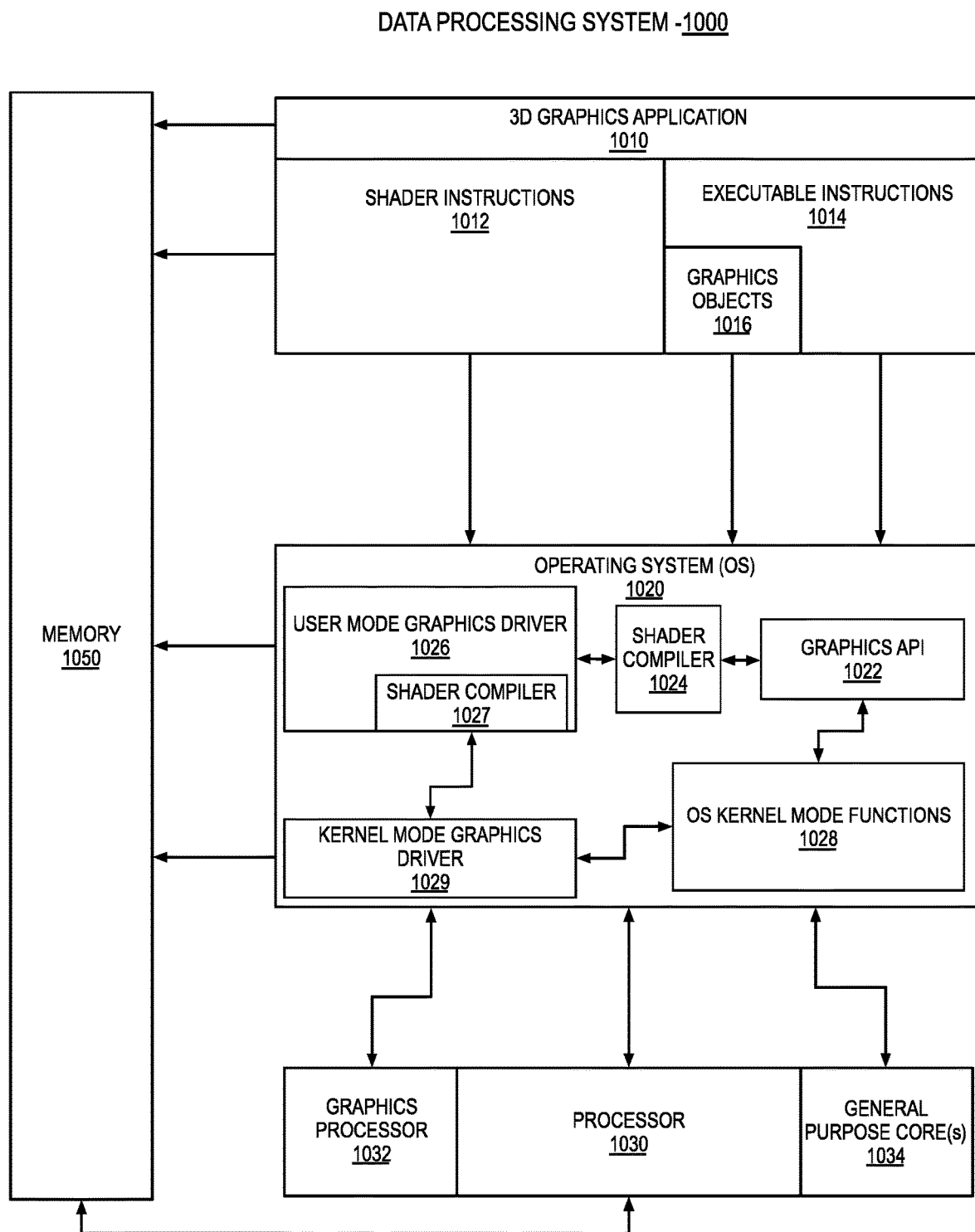
FIG. 10 illustrates exemplary graphics software architecture for a data processing system according to some embodiments.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034.

The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
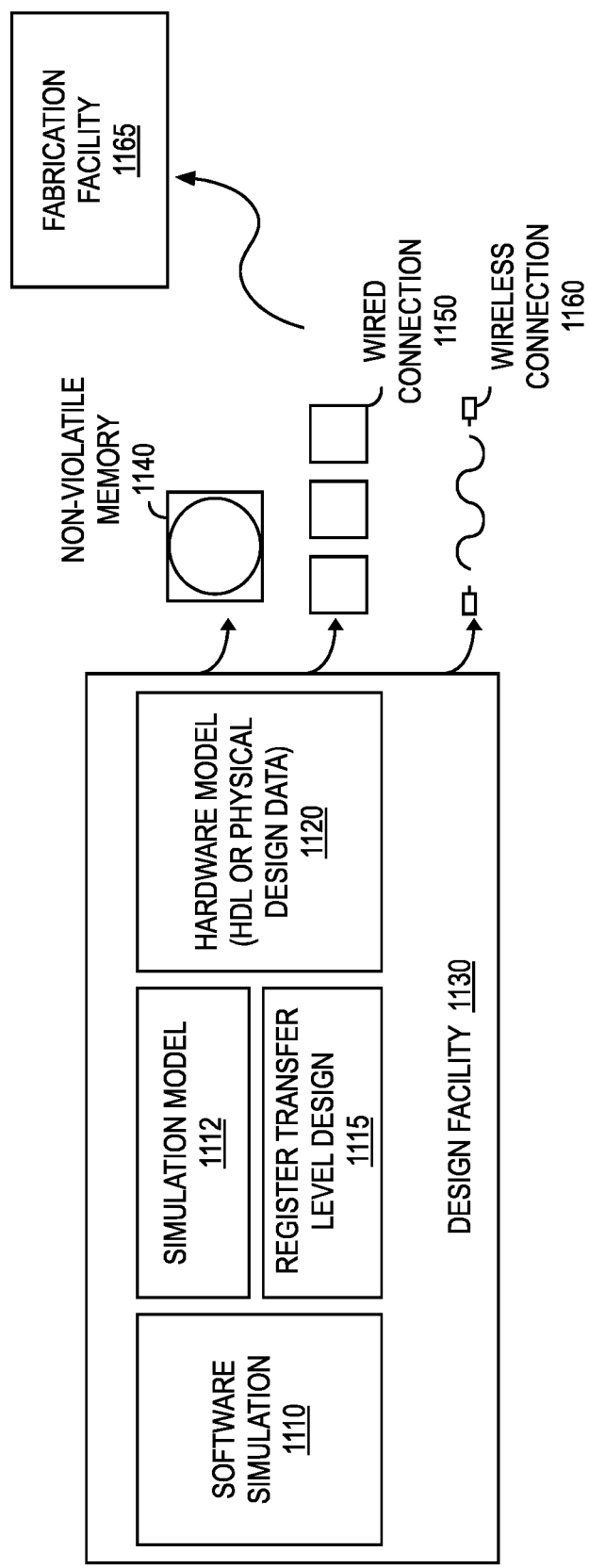
FIG. 11 is a block diagram illustrating an IP core development system, according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuit

Figure 12:
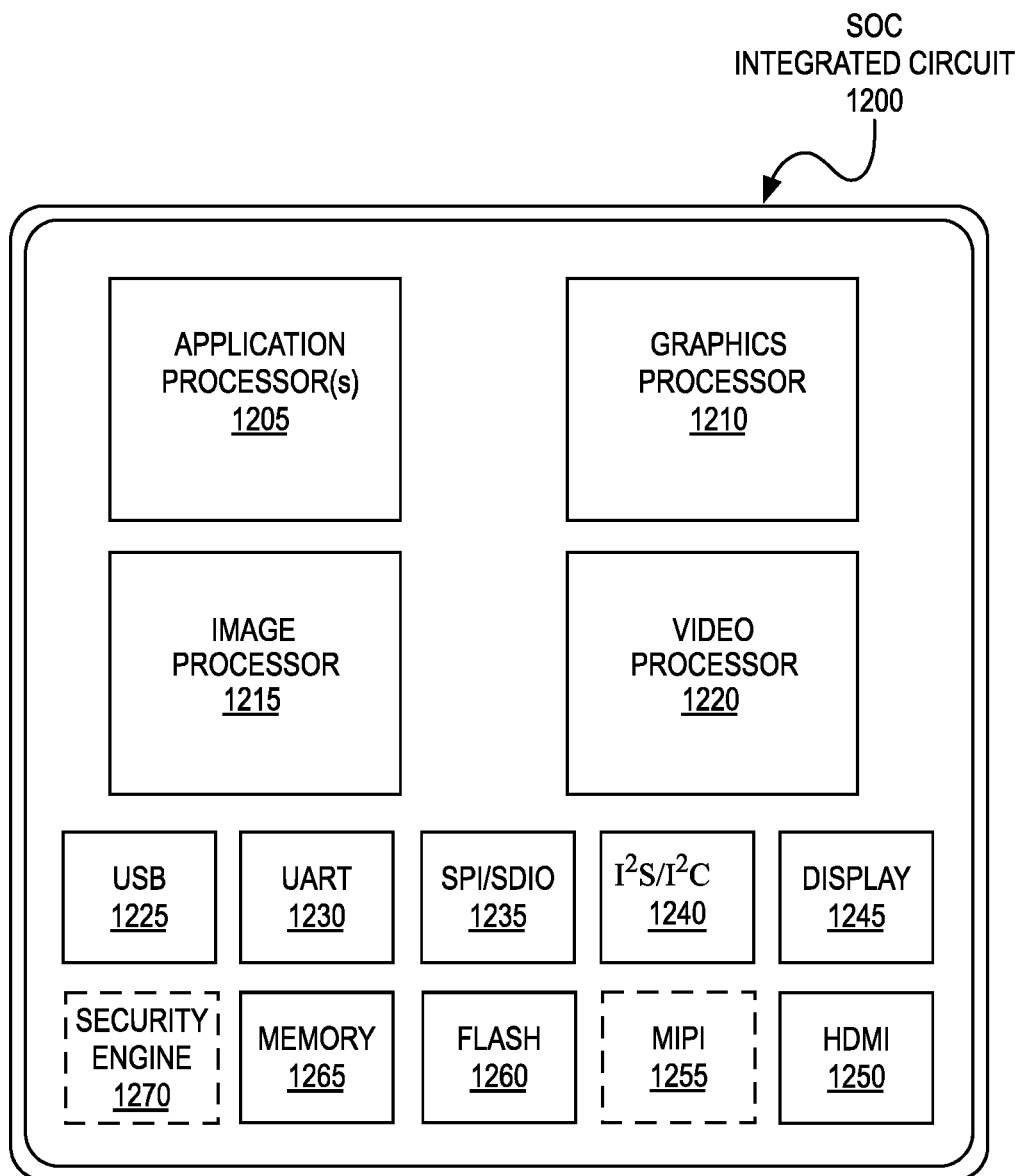
FIG. 12 is a block diagram illustrating an exemplary system on a chip integrated circuit, according to an embodiment.
Figure 13A:
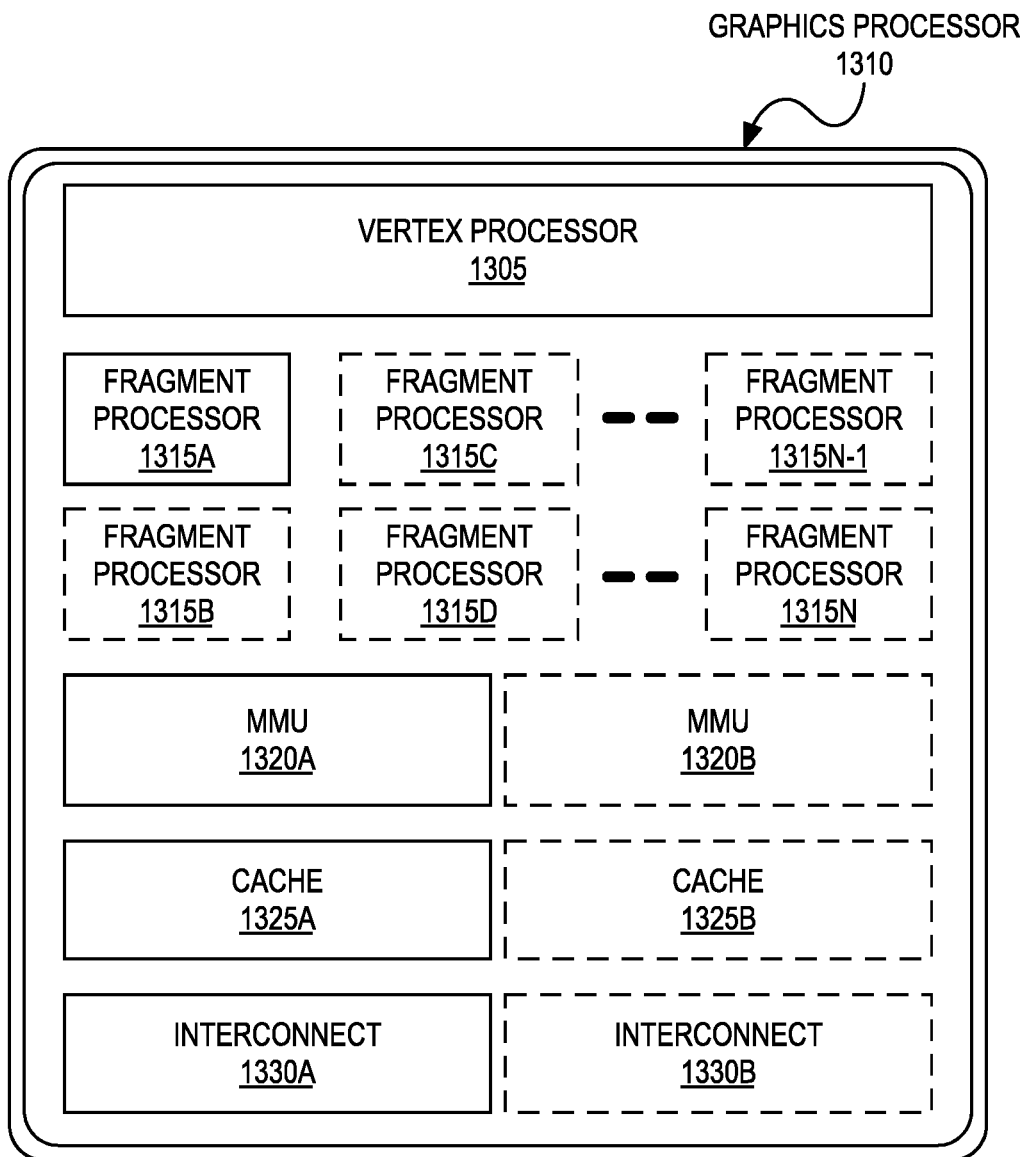
FIGS. 13A-13B are block diagrams illustrating exemplary graphics processors for use within an SoC, according to embodiments described herein.
Figure 13B:
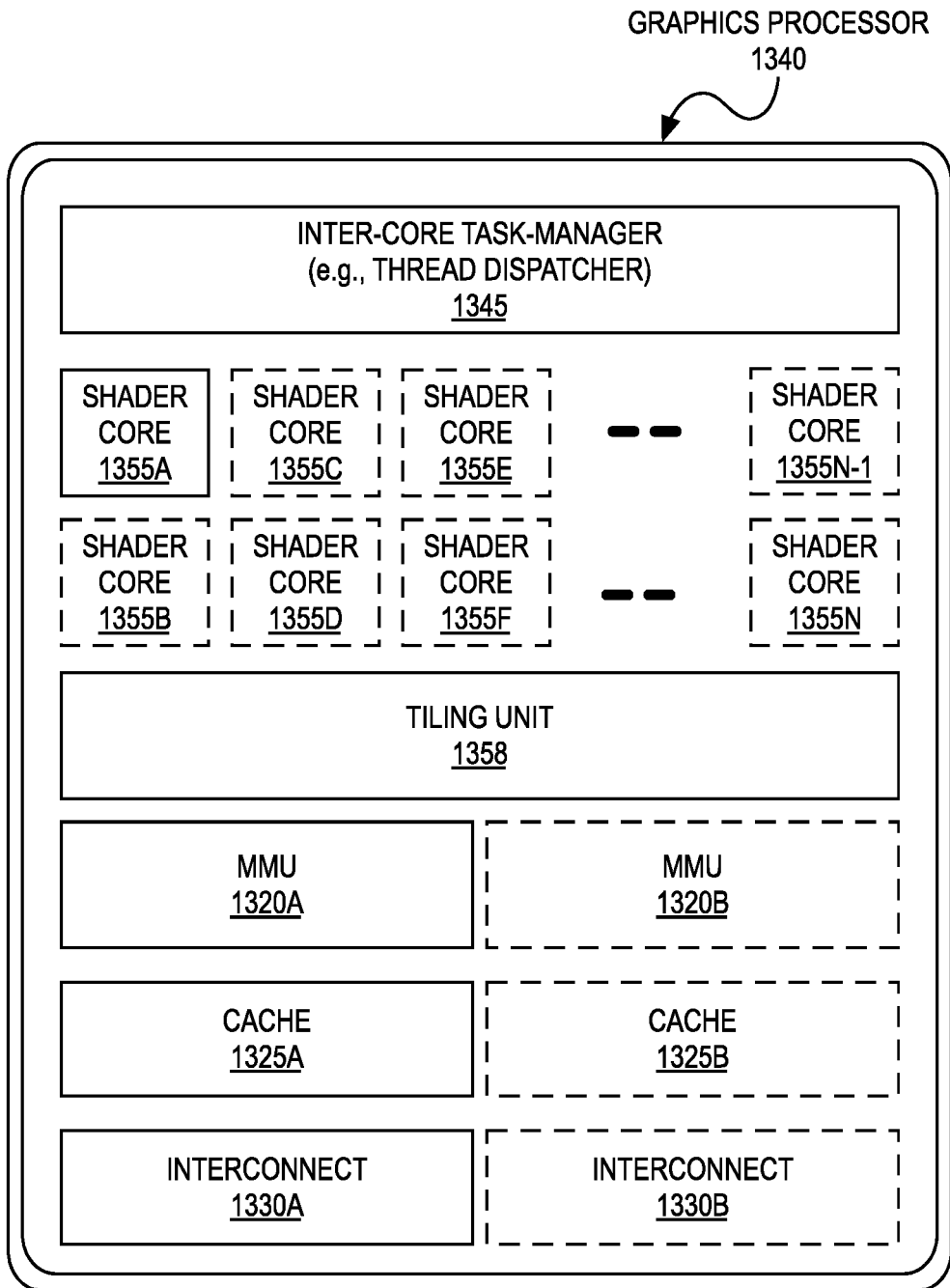
Figure 14:
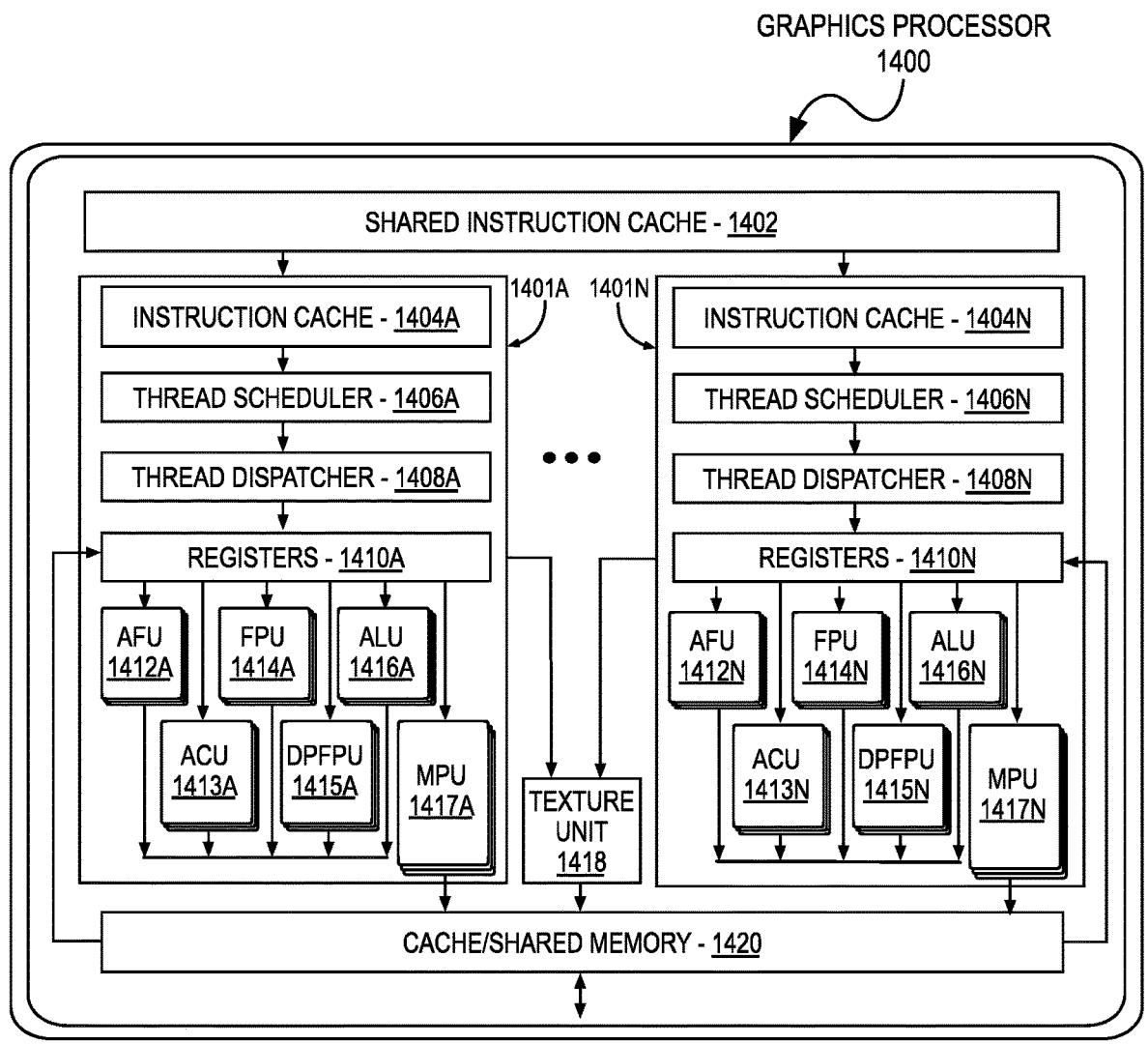
FIG. 14 is a block diagram illustrating an additional exemplary graphics processor of a system on a chip integrated circuit, according to an embodiment.

FIGS. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, caches 1325A-1325B, and circuit interconnects 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

FIG. 14 illustrates additional exemplary graphics processor logic according to embodiments described herein. One embodiment provides a graphics core 1400 that may be included within the graphics processor 1210 of FIG. 12, and may be a unified shader core 1355A-1355N as in FIG. 13B. The graphics core 1400 includes a shared instruction cache 1402, a texture unit 1418, and a cache/shared memory 1420 that are common to the execution resources within the graphics core 1400. The graphics core 1400 can include multiple slices 1401A-1401N or partition for each core, and a graphics processor can include multiple instances of the graphics core 1400. The slices 1401A-1401N can include support logic including a local instruction cache 1404A-1404N, a thread scheduler 1406A-1406N, a thread dispatcher 1408A-1408N, and a set of registers 1410A. To perform logic operations, the slices 1401A-1401N can include a set of additional function units (AFUs 1412A-1412N), floating-point units (FPU 1414A-1414N), integer arithmetic logic units (ALUs 1416-1416N), address computational units (ACU 1413A-1413N), double-precision floating-point units (DPFPU 1415A-1415N), and matrix processing units (MPU 1417A-1417N).

Some of the computational units operate at a specific precision. For example, the FPUs 1414A-1414N can perform single-precision (32-bit) and half-precision (16-bit) floating point operations, while the DPFPUs 1415A-1415N perform double precision (64-bit) floating point operations. The ALUs 1416A-1416N can perform variable precision integer operations at 8-bit, 16-bit, and 32-bit precision, and can be configured for mixed precision operations. The MPUs 1417A-1417N can also be configured for mixed precision matrix operations, including half-precision floating point and 8-bit integer operations. The MPUs 1417-1417N can perform a variety of matrix operations to accelerate machine learning application frameworks, including enabling support for accelerated general matrix to matrix multiplication (GEMM). The AFUs 1412A-1412N can perform additional logic operations not supported by the floating-point or integer units, including trigonometric operations (e.g., Sine, Cosine, etc.).

Winograd Convolution Accelerator Architecture

Embodiments described herein provide a scalable hardware architecture to enable a deep learning convolution accelerator having logic to perform generalized Winograd convolution for multiple kernel sizes and kernel strides without requiring hardware support for multiple Winograd transforms. The deep learning convolution accelerator supports all kernel sizes by using lower order 1-D filter Winograd F(4,3) method that supports convolutions with stride greater than 1. In one embodiment the cost of Winograd transform for higher order kernels is minimized by reusing the transforms of the lower order F(4,3). In general, the architecture provided herein addresses Winograd transform based CNN acceleration on a multi-dimensional SIMD machine. The architecture improves convolution performance while improving the compute per byte. Winograd transform based CNN accelerators can provide a ~2× improvement over other accelerators. Winograd enables faster convolution by reducing the number of multiplications within compute operations by transforming the inputs and kernels (e.g. filters) into a form that enables higher performance for given hardware resources. The Winograd transforms are performed on the fly and broadcasted to parallel compute logic (e.g., SIMD, SIMT, etc.) without increasing the bandwidth requirements for the hardware. Additionally, the reduced number of compute operations also results in an increase in performance per watt.

Deep learning neural networks are compute intensive and large networks can be performance limited. Embodiments described herein provide custom acceleration logic to accelerate the compute intensive workloads associated with deep learning neural networks, such as convolutional neural networks (CNNs). In CNNs, each layer performs 3D convolution on an input feature map, where each layer has different Kernel size and Stride requirements. In deep learning inference applications, it is important to achieve highest performance/watt and or performance/area. Direct convolution can be used to perform the above computations, but there exist a new class of fast algorithms for convolutional neural networks based on the minimal filtering algorithms pioneered by Winograd. However, the Winograd method requires different computational structure for different kernel size/stride, which limits the efficient use of Winograd transforms in hardware accelerators for neural networks.

Embodiments descried herein provide a unified hardware architecture that is based on F(4,3) Winograd Kernel convolution and derive higher order convolutions based on this base kernel. The derivation is performed in an optimized manner to achieve maximum performance per watt. Embodiments described herein make use of inline Kernel and Input data transforms without causing bandwidth increase and requiring minimal hardware complexity. The proposed hardware accelerator is configurable and scalable for efficient calculations of 3D convolutions using Winograd.

Figure 15A:
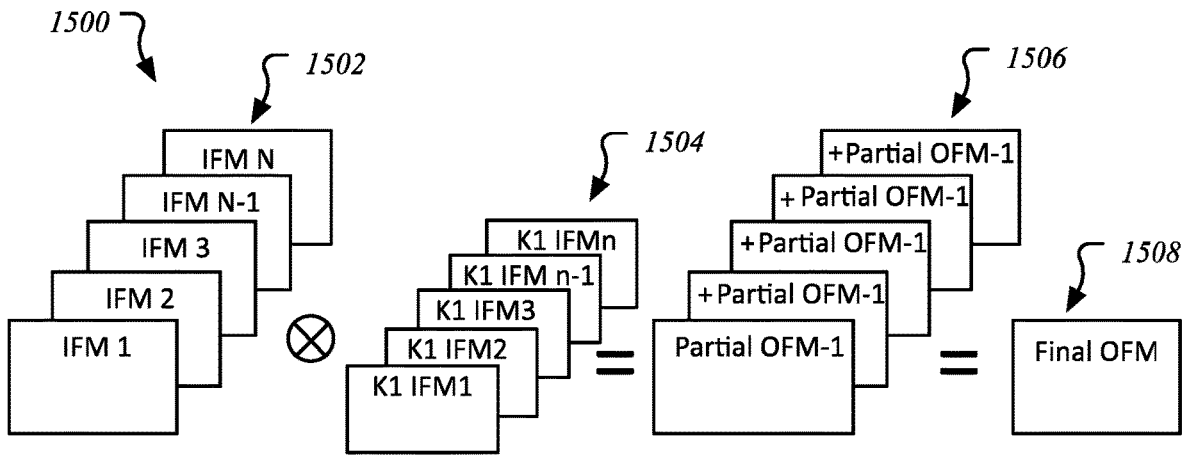
FIGS. 15A-15B illustrate Native and Winograd based 3D convolutions
Figure 15B:
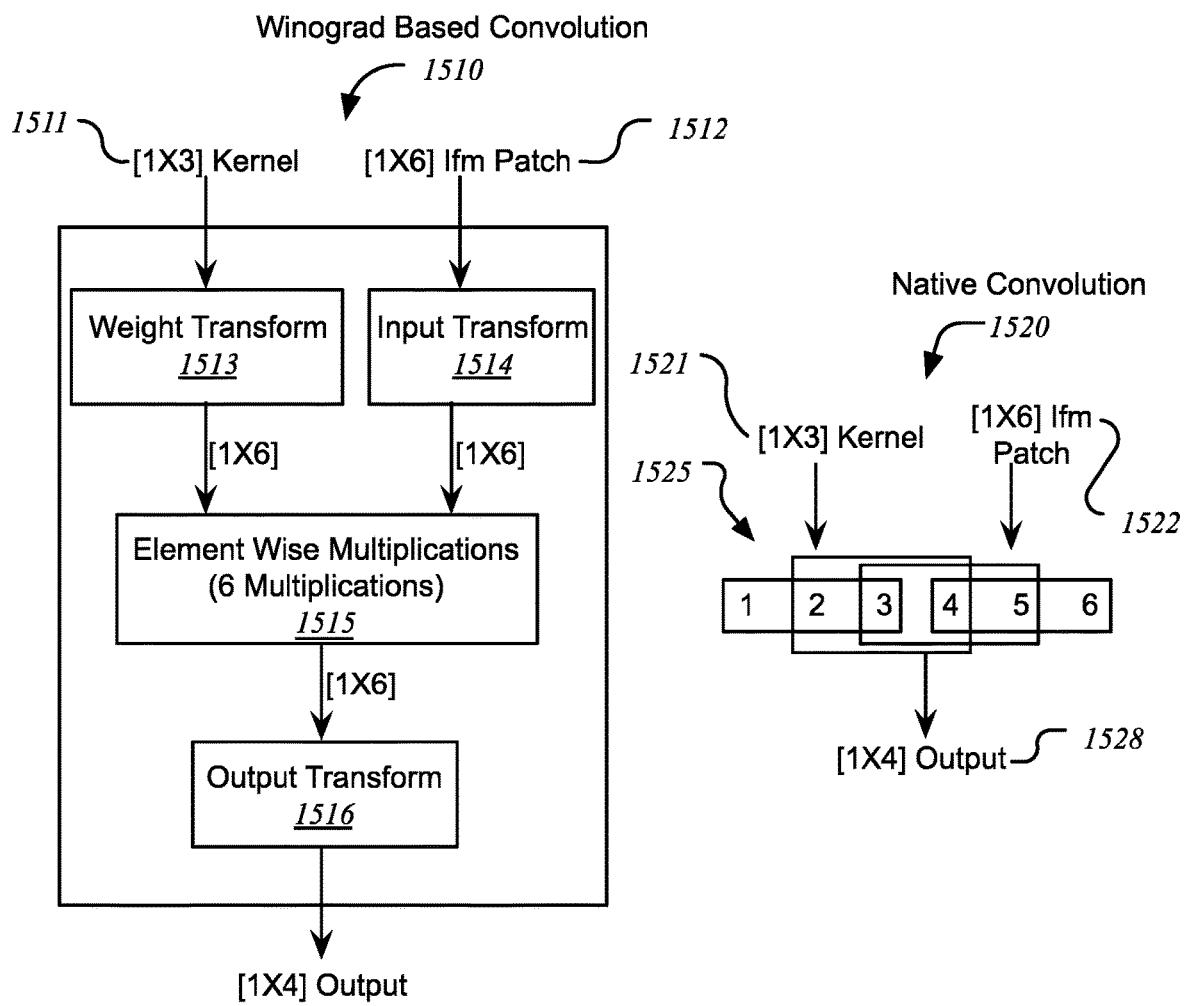

FIGS. 15A-15B illustrate Native and Winograd based 3D convolutions. FIG. 15A illustrates a 3D convolution operation 1500 for a convolutional neural network. FIG. 15B illustrates details of Winograd based convolution 1510 and native convolution 1520. The 3D convolution operation 1500 illustrated in FIG. 15A are key to convolution neural networks, which are suited for computer vision and speech acceleration applications. In 3D convolution, each input feature map (IFM) in a set of input feature maps 1502 (IFM1 through IFM N) is convolved 1504 with a corresponding convolution filter (K1) (e.g., K1, IFM1 through K1, IFMn). The partial results 1506 are summed to create a final output feature map (OFM) 1508. Processing operations for the convolution neural network requires many such 3D convolutions to be performed on the same IFMs to produce different OFMs.

As illustrated in FIG. 15B, embodiments described herein provide hardware accelerate logic that makes use of Winograd based convolution 1510 to enable CNN processing with reduced multiplications relative to native convolution 1520. In one embodiment, a Winograd transform is used to compute 1D convolutions for four pixels. This convolution can be repeated over the whole input feature map to compute the full output feature map. For example, a 1×3 kernel 1511 and a 1×6 input feature map patch can be transformed via a weight transform unit 1513 and an input transform unit 1514. The transformed 1×6 matrices can be processed via an element wise multiplication unit 1515 can perform the convolution. The convolution can be performed using six multiplications to generate a 1×6 intermediate output matrix. An output transform unit 1516 transforms the 1×6 intermediate output matrix into a 1×4 output 1518. The Winograd based convolution 1510 enables a reduced number of multiplications relative to native convolution 1520. To transform the 1×3 kernel 1511 and 1×6 IMF patch 1512 using native convolution 1520 utilizes a native convolution unit 1525, which requires 12 multiplications to generate the same 1×4 output matrix 1518. The acceleration architecture provided by embodiments described herein minimizes the cost of transforms significantly by reusing the input transform across all output feature maps, computing the transform in parallel. In one embodiment the transformed weights are stored in local memory to reuse across the entire output feature map. Different filter sizes can also be mapped to the same weight transform, which is a onetime operation for each filter. The broadcasting of transformed inputs amortizes the cost of the transform with negligible broadcast costs.

Winograd Support for Generic Kernel Sizes

Figure 16:
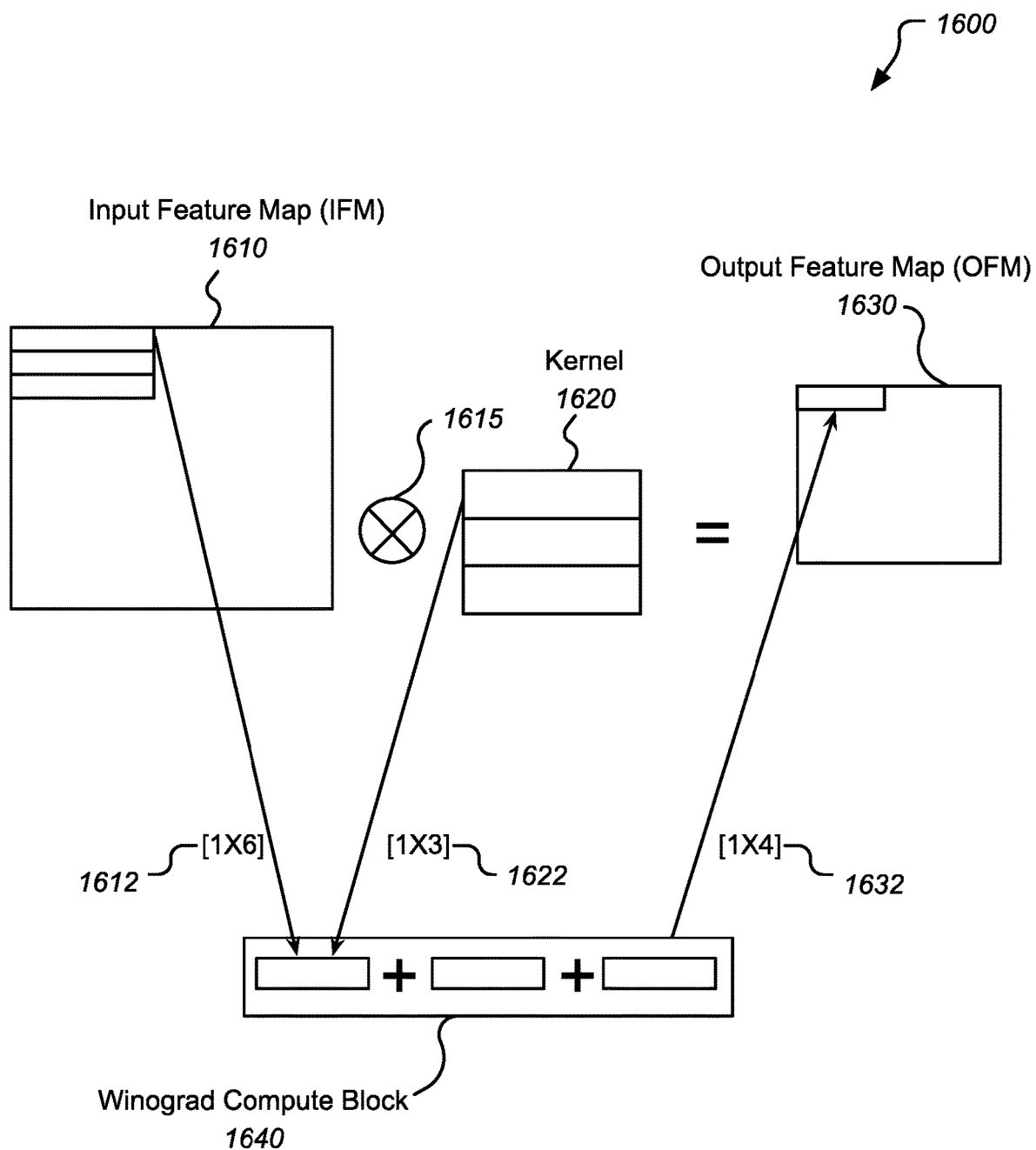
FIG. 16 illustrates an architecture for 2D/3D convolutions based on the F[4,3] convolution.

FIG. 16 illustrates an architecture 1600 for 2D/3D convolutions based on the F[4,3] convolution. The illustrated architecture 1600 breaks a 2D convolution filter into multiple 1-D kernels and performs Winograd based convolution to produce 2-D convolution output. The same transform is applied on multiple IFMs to produce a 3-D convolution output. In one embodiment, the illustrated architecture 1600 is implemented in part via hardware logic configured as a Winograd compute block 1640. The Winograd compute block 1640 performs a convolution operation 1615 using a [1×6] tensor 1612 from an input feature map 1610 and a [1×3] tensor 1622 from a convolution kernel 1620 to generate a [1×4] tensor 1632 that is a portion of an output feature map 1630.

For example, to perform 1-D convolution of size 1×5 using 1×3 Kernel, the following operations can be performed. A given 1×5 kernel K can be defined, where K=[1 2 3 4 5]. This 1×5 Kernel can be decomposed to sub-kernels $K_0$ and $K_1$ of size 1×3, where $K_0$=[1 2 3] and $K_1$=[4 5 0]. Compute logic, using $K_0$ and $K_1$, can perform Winograd based convolution with a corresponding patch of the IFM. The results can be combined to obtain a final result of kernel size [1×5]. The Winograd convolution can be performed using 12 multiplications, compared to 20 multiplications for native convolution, resulting in a 1.67× gain compared to native convolution. The process is repeated over 5 rows of the kernel to obtain the convolution result of size [5×5] filter. This approach is generic and can be applied to filters of any size. The proposed hardware architecture handles the decomposition of kernel and computing higher order kernels in multiple loops.

Figure 17:
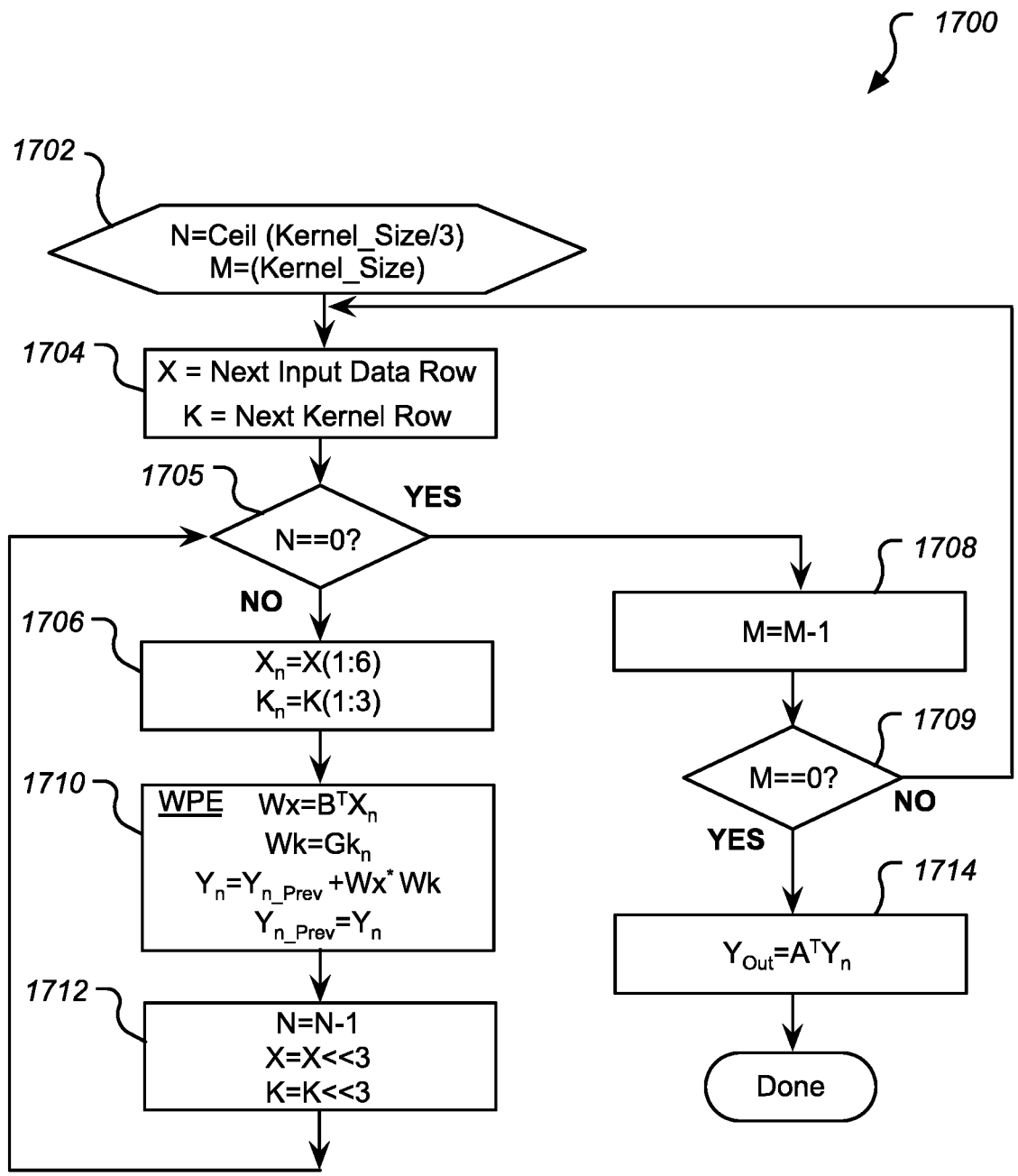
FIG. 17 illustrates logic to generalize F(4,3) Winograd convolution to higher order kernels.

FIG. 17 illustrates logic 1700 to generalize F(4,3) Winograd convolution to higher order kernels. The logic 1700 can be used to enable Winograd convolution for kernels of general size using a decomposition into multiple [1×3] kernels. In one embodiment the illustrated logic 1700 is implemented via hardware processing elements configured to perform Winograd convolution. The logic 1700 performs a first operation 1702 to determine values N and M. N specifies the number of Winograd operation passes to be performed for each row and M specifies the number of rows of operations to perform. N is computed by ceiling (Kernel_Size/3) and M is determined by the (Kernel_Size). For an exemplary Kernel_Size of 5, N=2 and M=5. The logic 1700 also performs a second operation 1704 to maintain values defining the next input data row (X) and next kernel row (K). Before performing a set of operations for a row, the logic 1700 performs an operation 1705 to determine if N equals zero. If N is not equal to zero, an operation 1706 is performed to load a 1D input tensor (e.g., $X_n$=X(1:6)) and Kernel data ($K_n$=X(1:3)) for a processing element operation. Operation 1710 provides the input and kernel tensor data to a Winograd Processing Element (WPE), which performs a Winograd transform on the input and weight tensor, an element-wise multiplication between the transformed inputs and weights, and a vector accumulate operation that adds the output of the multiplication (e.g., a partial output feature map) to a tensor value within an accumulator register, as shown by the illustrated operations, {Wx=$B^T X_n$; Wk=$Gk_n$; $Y_{n\_Prev}$+Wx*Wk; $Y_{n\_Prev}$=$Y_n$}. Wx and Wk are Winograd transformations of the input and kernel tensor data and Wx*Wk is an elementwise multiplication of the Winograd transformed tensors. $Y_{n\_Prev}$ represents the sum of the previous partial output feature maps. $B^T$ and G are F(4,3) Winograd transform matrices for input and Kernel data that are defined as:

$$B^T = \begin{bmatrix} 4 & 0 & -5 & 0 & 1 & 0 \\ 0 & -4 & -4 & 1 & 1 & 0 \\ 0 & 4 & -4 & -1 & 1 & 0 \\ 0 & -2 & -1 & 2 & 1 & 0 \\ 0 & -2 & -1 & -2 & 1 & 0 \\ 0 & 4 & 0 & -5 & 0 & 1 \end{bmatrix}$$

$$G = \begin{bmatrix} 1/4 & 0 & 0 \\ -1/6 & -1/6 & -1/6 \\ -1/6 & 1/6 & -1/6 \\ 1/24 & 1/12 & 1/6 \\ 1/24 & -1/12 & 1/6 \\ 0 & 0 & 1 \end{bmatrix}$$

The logic 1700 then performs operation 1712 to select the next set of input and weight data within a row {N=N−1; X=X<<3; K=K<<3}. The logic 1700 returns to operation 1705 to determine if additional passes for a row are required. Once the passes for a row are complete (e.g., N==0), the logic 1700 can move to the next row (e.g., M=M−1 at operation 1708). Until all rows are processed (e.g., M==0 at operation 1709), the logic returns to operation 1704. Once the logic 1700 completes processing for each row, as determined via operation 1709, the logic 1700 can perform an inverse transform operation 1714 in which an inverse Winograd transform is performed on a summed output feature map $Y_n$ (e.g., $Y_{Out}$=$A^T Y_n$), where $A^T$ is an inverse Winograd transform for an output feature map, defined as:

$$A^T = \begin{bmatrix} 1 & 1 & 1 & 1 & 1 & 0 \\ 0 & 1 & -1 & 2 & -2 & 0 \\ 0 & 1 & 1 & 4 & 4 & 0 \\ 0 & 1 & -1 & 8 & -8 & 1 \end{bmatrix}$$

Multi Stride Convolution

Winograd transform brings the efficiency in compute by reducing the multiplication required to compute adjacent pixels. For convolutional layers which work on stride >1, conventional solutions would require the Winograd transform to be modified. For example, convolution with stride 2 would perform the convolution operation for alternate pixels. In order to support strides greater than one using a conventional Winograd transform, inputs data is modified using steering write logic, which modifies the input data when writing the data to internal memory of the accelerator.

Figure 18:
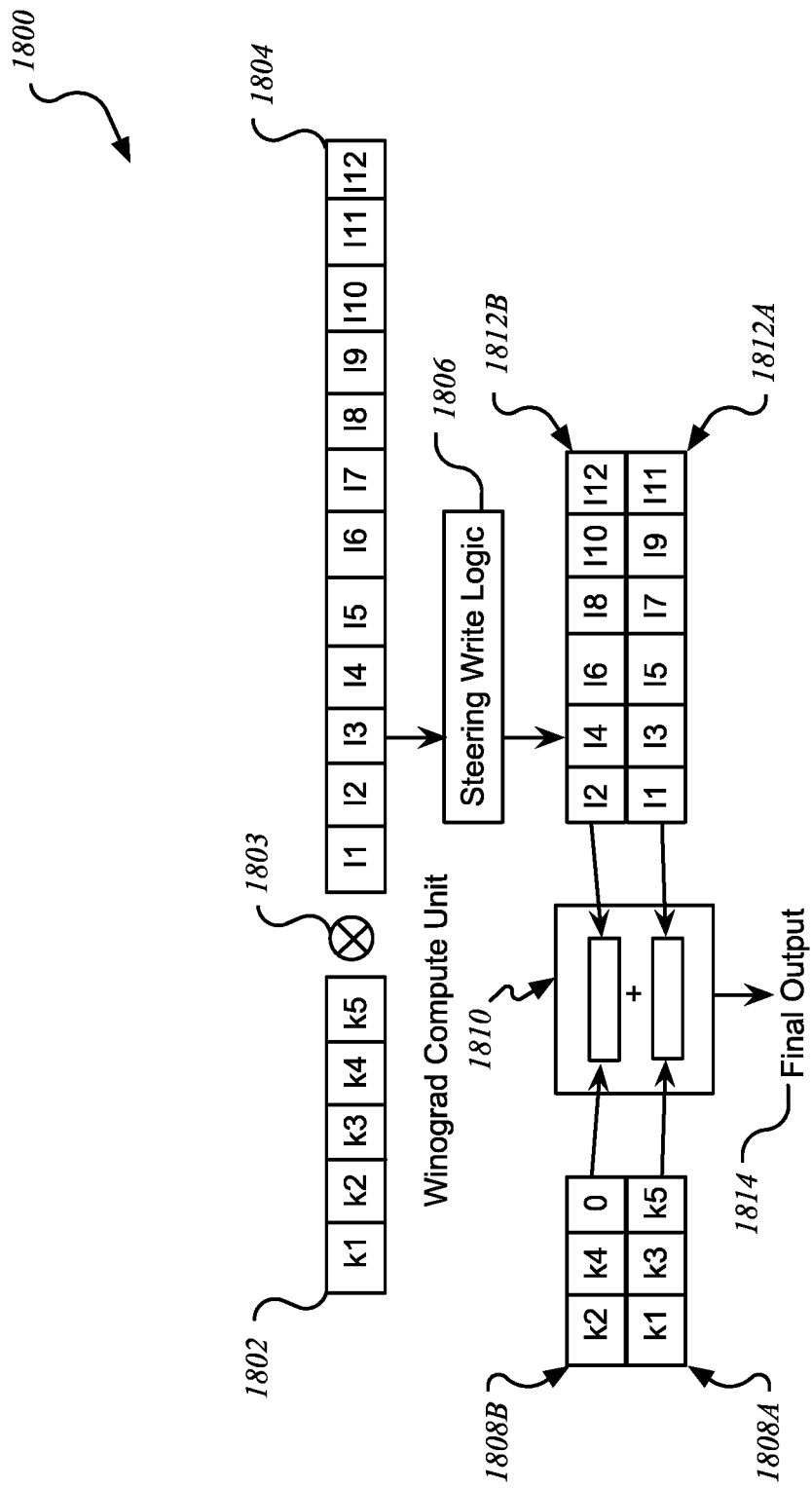
FIG. 18 illustrates an exemplary logic and data layout to enable multi-stride convolution, according to an embodiment.

FIG. 18 illustrates an exemplary logic and data layout 1800 to enable multi-stride convolution, according to an embodiment. The exemplary logic and data layout 1800 is configured for kernel size of five and a kernel stride of two.

In one embodiment, a steering logic block (e.g., steering write logic 1806) is provided that hides the alternate pixels from Winograd transform. A 1×5 kernel 1802 having elements {k1, k2, k3, k4, k5} can be decomposed into two 1×3 kernels based on an exemplary kernel stride of two, where a first decomposed kernel 1808A includes elements {k1, K3, and K5}, while a second decomposed kernel 1808B includes elements {k2, k4, 0}. A patch of input data 1804 that is stored contiguously in memory can be written out to a buffer within Winograd compute logic via steering write logic 1806. The steering write logic can write the input data such that data of stride 2 is stored contiguously within the buffer. For example, a 1×12 input patch having elements {I1, I2, I3, I4, I5, I6, I7, I8, I9, I10, I11, I12} can be written out to a buffer, such that a first input data tensor 1812A includes elements {I1, I3, I5, I7, I9, I11} and a second input data tensor 1812 includes elements {I2, I4, I6, I8, I10, I12}. A Winograd compute unit 1810 can then perform an F(4,3) Winograd convolution between the respective 1×3 kernels 1808A-1808B and 1×6 input data tensors 1812A-1812B, the partial outputs being summed to create a final output 1814. The illustrated technique can be modified as necessary to enable multi-stride convolution of various strides, as control logic, such as the steering write logic 1806 can be configured accordingly for various strides greater than one.

Figure 19:
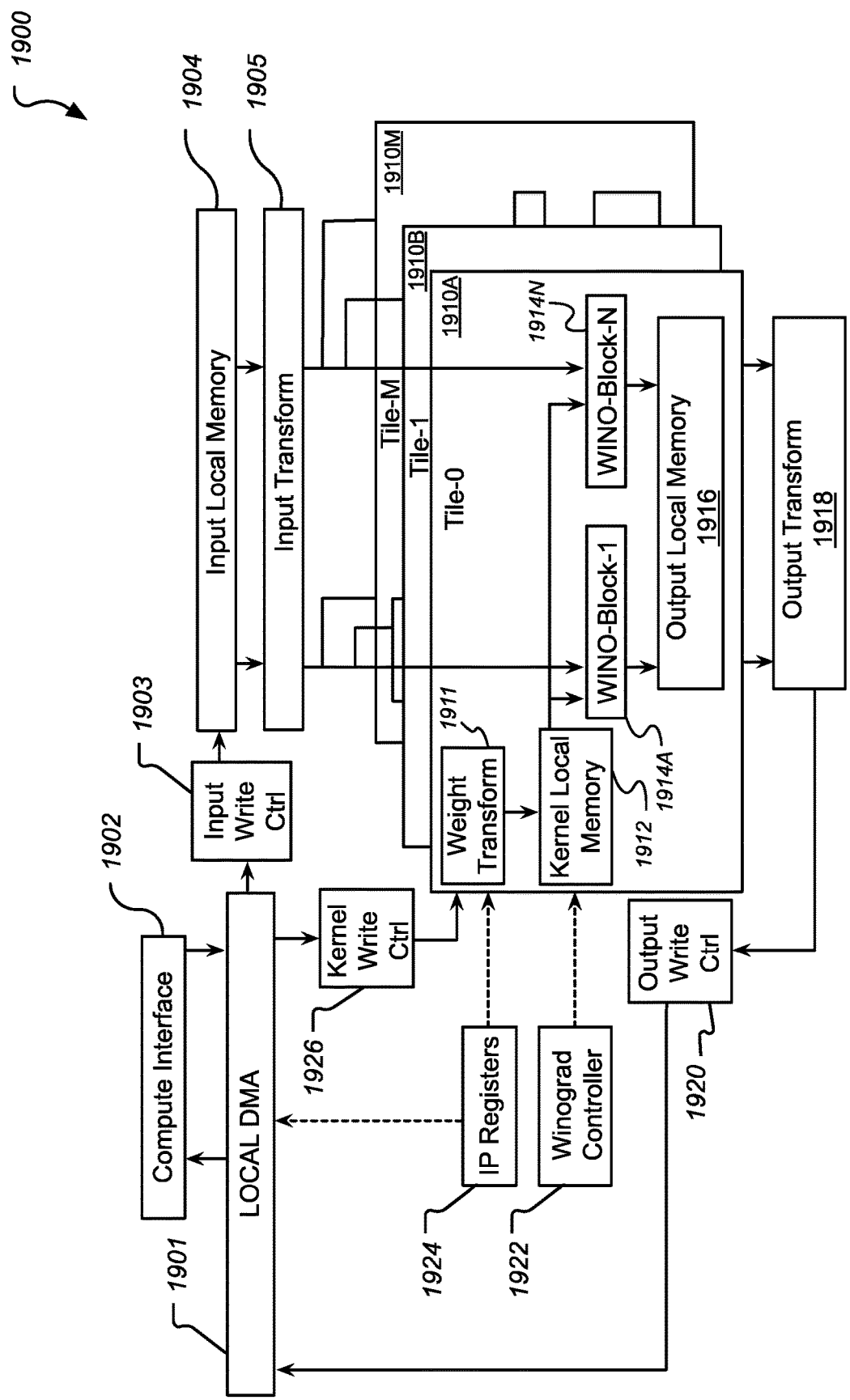
FIG. 19 is a block diagram of a Winograd acceleration architecture according to embodiments described herein.

High Level Architecture:

FIG. 19 is a block diagram of a Winograd acceleration architecture 1900 according to embodiments described herein. The illustrated acceleration architecture 1900 has a parameterizable number of processing tiles 1910A-1910M (e.g., Tile-0 through Tile-M), each tile having an array of Winograd compute blocks 1914A-1914N (WINO-Block-1 through WINO-Block-N) to perform convolution operations using Winograd transforms. In one embodiment the Winograd acceleration logic 1900 includes a compute interface 1902, which can be one of any number of high-performance compute interfaces, including network-based interfaces. The compute interface 1902 sends and receives commands and data to a local DMA unit 1901. The local DMA unit 1901 is a data fetch engine that includes a variety of memory access and transmission logic units capable of performing load and store operations to and from the various memory units within the Winograd acceleration architecture 1900.

The Winograd acceleration architecture 1900 additionally includes an input write controller 1903 and a kernel write controller 1926, which each include steering logic, such as the steering write logic 1806 of FIG. 18, to enable support for multi-stride convolution. The kernel write controller 1926 is also configured to distribute specific kernel data to specific tiles 1910A-1910M. A set of IP registers 1924 includes accelerator configuration registers to provide topology information to the Winograd acceleration architecture 1900. Provided topology information incudes kernel and input patch size, kernel stride, number of input and output feature maps, and other information used to configure convolution operations within the Winograd acceleration architecture 1900. In one embodiment, a separate control interface is provided to configure the IP registers 1924. The IP registers 1924 can be configured on a layer-by-layer basis, such that each CNN layer can be configured differently. In one embodiment, the layer-by-layer topology of an entire CNN model can be pre-configured within the IP registers 1924 to enable streamlined processing of the CNN.

One embodiment additionally includes a Winograd controller 1922, which is a core controller that controls compute loops and data access to and from local memories (e.g., input local memory 1904) based on topology information provided to the IP registers 1924. In one embodiment the Winograd controller 1922 is a microcontroller that controls the control flow for the operations performed by the Winograd compute blocks 1914A-1914N within each tile 1910A-1910M. Control flow control perform by the Winograd controller includes determining the manner and order in which the partial and final output feature maps are computed. The Winograd controller 1922, in one embodiment, manages control flow by issuing commands and instructions to the Winograd compute blocks 1914A-1914N within each tile 1910A-1910M. In one embodiment the Winograd controller 1922 can perform fine-grained control of the Winograd compute blocks 1914A-1914N, including issuing specific multiply and accumulate instructions for various phases of the Winograd convolution. The Winograd controller 1922 can also sequence and issue a series of complex logic operations to enable multi-stride and multi-sized kernel convolution, as described herein, using a single Winograd transform (e.g., the F(4,3) Winograd transform), enabling the Winograd compute architecture 1900 to support multiple kernel sizes and kernel strides without requiring hardware logic to support multiple different types of transforms. Although the architecture described herein is configured for the F(4,3) Winograd transform, other embodiments can implement similar techniques using hardware designed for other Winograd transforms {F(m,r)}, where such hardware computes m outputs using an r-tap finite impulse response (FIR) filter defined at least in part via a 1xr kernel.

The Winograd compute architecture 1900 includes various internal memories, such as input local memory 1904, output local memory 1916, and Kernel local memory 1912. The input local memory 1904 is used to store the minimum input data required to start the compute. Data stored in the input local memory 1904 can be reused across all processing tiles 1910A-1910M. Data from the input local memory 1904 can be transformed by an input transform unit 1905 when provided to the various processing tiles 1910A-1910M. Additional details on input transform and the input transform unit 1905 is described with respect to FIG. 20.

The output local memory 1916 is included within each processing tile 1910A-1910M and stores partially computed output data. The kernel local memory 1912 stores kernel data to use in output feature map compute. The kernel local memory 1912 is included within each processing tile 1910A-1910M and stores transformed kernel data output by a weight transform unit 1911. The transformed weight data can be re-used by each Winograd compute block 1914A-1914N within a single tile, with each tile 1910A-1910M including a separate weight transform unit 1911. The weight transform cost is paid per tile, as each tile computes a different output feature map, where each output feature map is associated with a different kernel. The weight transform is done before writing to kernel local memory 1912, enabling reuse across the entire output feature map compute, enabling a reduction in operational power for the Winograd acceleration architecture 1900. Additional optimizations to the weight transform unit 1911 are described with respect to FIG. 22.

Data stored in input local memory 1904 can be re-used across all processing tiles 1910A-1910M. Kernel transformed data is re-used across all Winograd compute blocks 1914A-1914N within each tile. In one embodiment, each of the Winograd compute blocks 1914A-1914N include multiple multiply accumulate compute units to perform multiple elementwise multiplication and accumulate operations to generate partial results for all input feature maps. Additional information on the Winograd compute blocks 1914A-1914N is provided with respect to FIG. 21.

In one embodiment Intermediate data is stored in output local memory 1916 before transformation by an output transform unit 1918. The output transform unit 1918 performs output transforms for all tiles 1910A-1910M, avoiding the need to perform an output transform within each tile. In one embodiment, the output transform unit 1918 can perform an output transform (e.g., inverse Winograd transform) for a 1×6 output tensor to generate a 1×4 output tensor. The output transform can be performed in parallel for one or more of the tiles 1910A-1910M. Output write is controlled by an output write control unit 1920, which reads output data and writes the output data to external memory via the local DMA unit 1901. In one embodiment the output transform unit 1918 can automatically perform an inverse Winograd transform for output feature maps that are read from the output local memory 1916 by the output write control 1920. The output write control unit 1920 reads the data from the output local memory 1916 in each tile 1910A-1910M and arranges the data in the proper write format from use by the local DMA unit 1901. In one embodiment the output write control 1920 serializes output from each tile 1910A-1910M to reduce the amount of memory bandwidth consumed by the output write. While output write is serialized in such embodiment, compute operations within each tile 1910A-1910M is performed in parallel. During the draining of output data from local memory, any required bias additions are performed if required.

Figure 20:
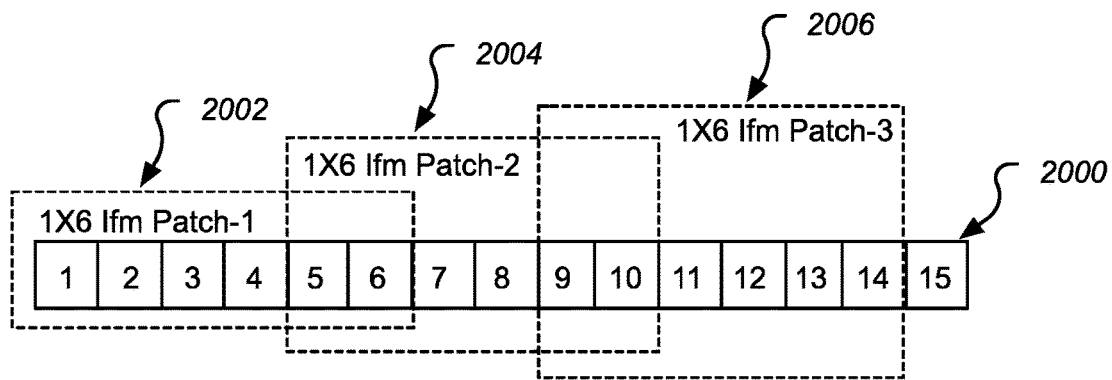
FIG. 20 illustrates input transform, according to an embodiment.

FIG. 20 illustrates input transform, according to an embodiment. The Input transform, in one embodiment, is performed by an input transform unit, such as the input transform unit 1905 in FIG. 19. The data of the input feature map 2000 is transformed and distributed to each Winograd compute tile (e.g., Winograd compute tile 1910A-1910M of FIG. 19) as needed.

A Winograd input transform is used to calculate the Winograd transform of a given input feature map 2000. For F(4,3) Winograd convolution, input transform $B^T$, shown above, is used. The transformation is performed inline and the values of the input feature map 2000 can be accessed in an overlapped manner. For example, for a given input feature map 2000, a first 1×6 input feature map patch 2002 partially overlapping with a second 1×6 input feature map 2004, which overlaps in part with a third 1×6 input feature map patch 2006.

Figure 21:
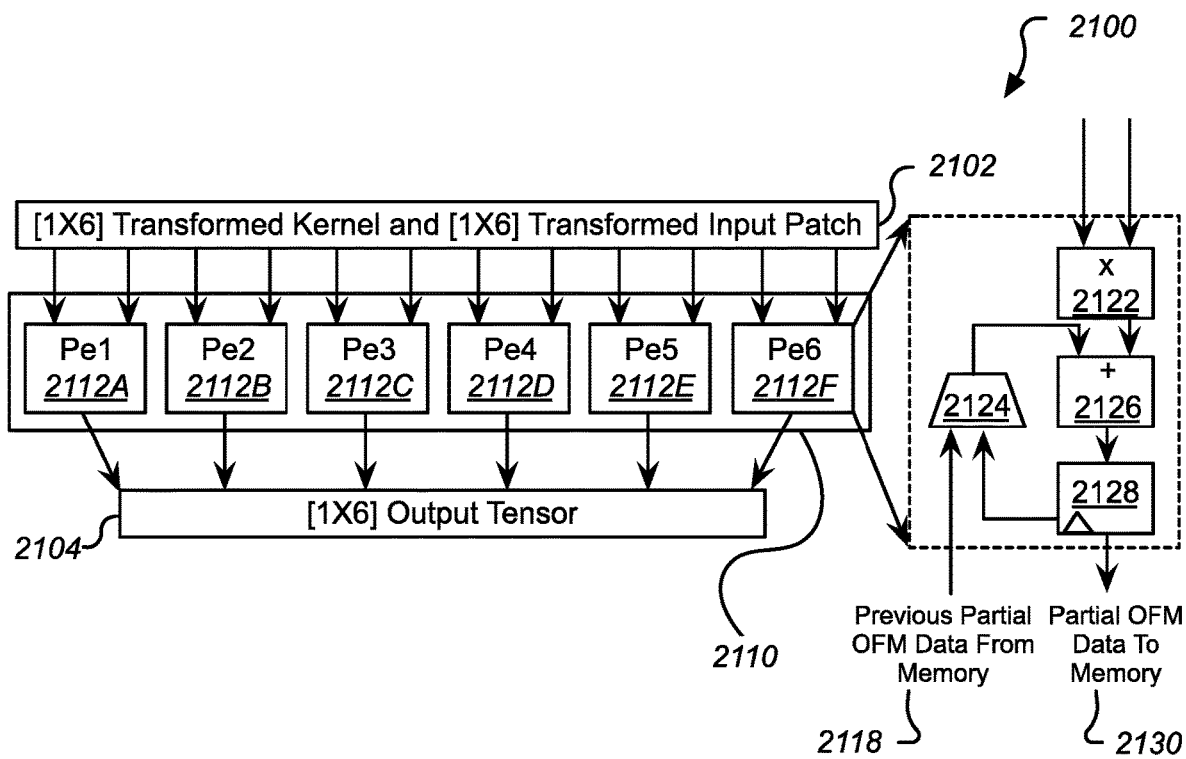
FIG. 21 illustrates an architecture for a Winograd compute block, according to an embodiment.

FIG. 21 illustrates an architecture for a Winograd compute block 2100, according to an embodiment. The Winograd compute block 2100 is a version of the Winograd compute blocks 1914A-1914N. The Winograd compute block 2100 can accept as input 2102 a 1×6 transformed kernel and a 1×6 transformed input patch. The input 2102 is processed by an array of Winograd processing elements 2110 to generate a 1×6 output tensor 2104. The 1×6 output tensor 2104 is an untransformed output. An inverse Winograd transform can be applied to the output tensor 2104 to generate a 1×4 output tensor.

The illustrated array of processing element 2110 includes Six Winograd processing elements (e.g., Pe1 2112A through Pe6 2112F) to enable the elementwise multiply and accumulate operations for F(4,3) Winograd convolution. However, the Winograd compute block 2100 may be scaled during design phase for different forms of Winograd convolution. An exemplary processing element (e.g. Pe6 2112F) includes a multiplier 2122, an adder 2126, an accumulator register 2128, and a multiplexer 2124. Each processing element 2112F can perform a multiply or an add operation, as specified by commands provided by a Winograd controller, such as the Winograd controller 1922 of FIG. 19, and as illustrated in operation 1710 of FIG. 17. Partial output feature map data 2130 ($Y_{n\_Prev}$ as in FIG. 17) can be stored in the accumulator register 2128 and output to memory (e.g., output local memory 1916 of FIG. 19). Previous partial output feature map data 2118 ($Y_{n\_Prev}$ as in FIG. 17) can be read from memory as specified by the Winograd controller 1922.

For each input feature map fetched from memory, the Winograd compute architecture described herein, in one embodiment, performs calculation for multiple output feature maps before fetching the next input feature map. The number of output feature maps being computed in parallel depends on number of processing tiles. The Winograd compute architecture described herein can be used to implement a compute accelerator that can be designed for used with any input memory size and can be configurable for different market segments depending on the area budget. For example, accelerators that are targeted at training or inferencing can be designed. The resulting accelerator can provide as much as a 2× increase in performance relative to other neural network compute solutions. In various embodiments the architecture can be implemented in various types of compute units, including general purpose graphics processors (e.g., GPGPUs), field programmable gate arrays (FPGA), and hybrid accelerators using a variety of different types of compute units.

Bandwidth Optimized Hardware to Compute Winograd Kernel Transforms

The transformations for the input and output data for Winograd convolution are relatively cheap from a computational perspective, as these transforms have compute requirements of the order O(N). However, Kernel/weight transforms are order $O(N^2)$ and generally require costly division operations. As kernels are known in advance, it may be possible to perform the kernel transforms offline and use the transformed Kernels during the compute. However, this offline kernel transforms increases the memory bandwidth requirement of the system, as the transformed kernels are larger in size. For example, in the case of a 3×3 Kernel, the bandwidth requirement doubles. In case of a 5×5 kernel, the transform increases the bandwidth by 240%.

Embodiments descried herein provide hardware logic to enable optimized kernel/weight transforms for Winograd convolution. The hardware logic enable an optimized Winograd compute architecture reduces the complexity of in-line kernel transformations without significantly increasing hardware resource and memory bandwidth requirements. The optimized kernel/weight transform allows simplified hardware logic, in that the optimized transforms do not require hardware devisors that would otherwise be used for inline weight transformation and do not increase bandwidth requirements, as with offline weight transformation. The techniques described herein are computationally accurate and do not result in any reduction in accuracy. Such techniques may be particularly suited for inference optimized hardware, which is generally embedded hardware in which performance per watt or performance per area are of particular importance.

One embodiment provides hardware logic that enables the kernel transformation to be split into multiple phases. The first phase includes a division operation, which can be performed offline without increasing memory bandwidth requirements, as the size of the kernels after the first transform phase is the same as the original kernels. The second phase can be performed inline to general the final transformed weights. The second phase of the transform is done in-line with the compute operations using only addition operations, without resulting an increase in memory bandwidth requirements.

In one embodiment, Winograd convolution is performed using an F(4,3) transform, which uses the kernel transform G, which is described above, and also shown below:

$$G = \begin{bmatrix} 1/4 & 0 & 0 \\ -1/6 & -1/6 & -1/6 \\ -1/6 & 1/6 & -1/6 \\ 1/24 & 1/12 & 1/6 \\ 1/24 & -1/12 & 1/6 \\ 0 & 0 & 1 \end{bmatrix}$$

The kernel transform matrix consists of division by 6, 12 and 24 which are not easy to implement in hardware without consuming costly hardware resources. Accordingly, the weight transformation is modified into G', as shown below:

$$G' = 1/3 \begin{bmatrix} 3/4 & 0 & 0 \\ -1/2 & -1/2 & -1/2 \\ -1/2 & 1/2 & -1/2 \\ 1/8 & 1/4 & 1/2 \\ 1/8 & -1/4 & 1/2 \\ 0 & 0 & 1 \end{bmatrix}$$

The first phase of the transform can be performed offline as a divide-by-three operation on the pre-transformed kernel data. The offline transformed weights can then be stored in system memory. The remaining scaling and addition transformation operations of the second phase can be performed in-line during convolution by weight transform logic (e.g., weight transform logic 1911 of FIG. 19) using a modified second phase weight transform.

Figure 22:
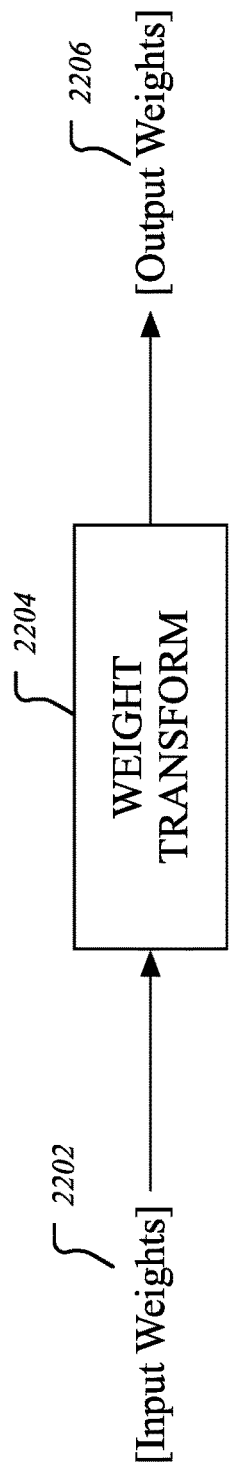
FIG. 22 illustrates logic configurable to perform native and optimized weight transformation.

FIG. 22 illustrates logic configurable to perform native and optimized weight transformation. Transformations can be performed on input weights 2202 via a weight transform unit 2204 to generate a set of output weights 2206. The tables below show Native Winograd weight transforms contrasted with the optimized Weight transforms provided by embodiments described herein. For a given pre-transformed kernel K having elements [$k_0$, $k_1$, $k_2$], a native Winograd weight transform can be performed using a weight transform configured as in Table 1 below:

TABLE 1

Native F(4, 3) Winograd weight transform

| | |
|---|---|
| $K'_0 =$ | $K_0 >> 2$ |
| $K'_1 =$ | $-(K_0 + K_1 + K_2)/6$ |
| $K'_2 =$ | $(K_1 - K_0 - K_2)/6$ |
| $K'_3 =$ | $(K_0 + 2K_1 + 4K_2)/24$ |
| $K'_4 =$ | $(K_0 - 2K_1 + 4K_2)/24$ |
| $K'_5 =$ | $K_2$ |

One embodiment described herein uses a modified kernel transform based on offline transformed kernel $k_m$ having elements $$\left[ km_0 = \frac{k_0}{3}, km_1 = \frac{k_1}{3}, km_2 = \frac{k_2}{3} \right],$$

where the in-line transformation is configured as shown in Table 2 below.

TABLE 2

Optimized F(4, 3) Winograd weight transform

| | |
|---|---|
| $K'_0 =$ | $((Km_0 << 1) + Km_0) >> 2$ |
| $K'_1 =$ | $-(Km_0 + Km_1 + Km_2) >> 1$ |
| $K'_2 =$ | $(Km_1 - Km_0 - Km_2) >> 1$ |
| $K'_3 =$ | $(Km_0 + (Km_1 << 1) + (Km_2 << 2)) >> 3$ |
| $K'_4 =$ | $(Km_0 - (Km_1 << 1) + (Km_2 << 2)) >> 3$ |
| $K'_5 =$ | $(Km_2 << 1) + Km_2$ |

Using the in-line transform shown in Table 2, the weight transform logic within a Winograd compute accelerator can be implemented using significantly reduced hardware logic complexity, resulting in a reduction in power and/or area of an optimized weight transform unit relative to a standard, un-optimized weight transform unit. The weight transform described herein can be further optimized by re-using adders to perform the computations for different weights.

Figure 23:
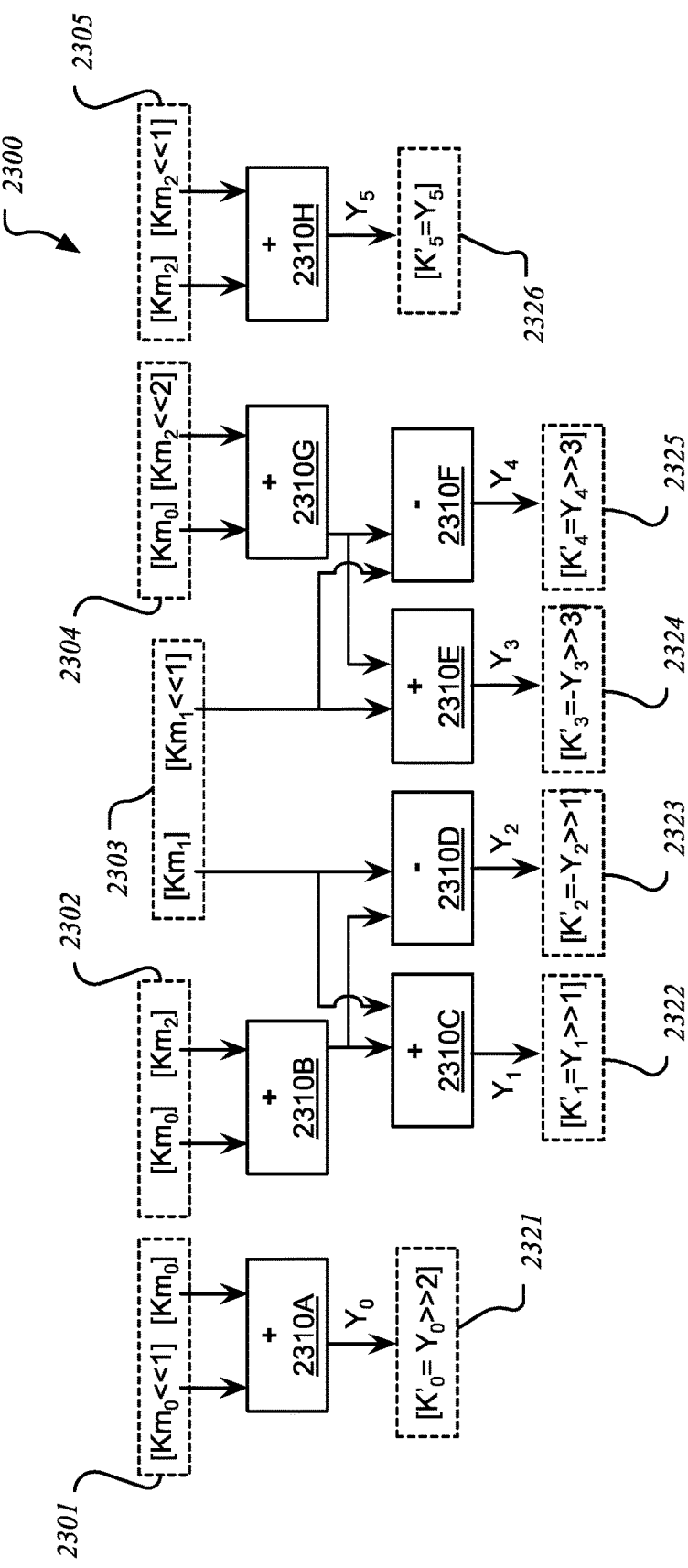
FIG. 23 illustrates an optimized Winograd weight transform architecture, according to an embodiment.

FIG. 23 illustrates an optimized Winograd weight transform architecture 2300, according to an embodiment. The illustrated architecture 2300 uses eight adders 2310A-2310H per weight transform. For fixed point accelerators, such implementation may be more efficient in area and/or power compared to using divisor logic units, as the cost scales with the number of operations being performed (e.g., computing multiple output feature maps in parallel). The optimization provided by one embodiment allows the sharing of inputs and stacking of outputs from certain adders, to enable the weight transform shown in Table 2 to be performed using a reduced number of logic units.

The optimized hardware provides five inputs into the eight adders 2310A-2310H to generate six transformed kernel elements. A first input 2301 ([$Km_0$<<1], [$Km_0$]) is provided to the first adder 2310A to generate a first intermediate output $Y_0$. The first intermediate output $Y_0$ is right shifted to generate a first transformed kernel element 2321 ([$K'_0$=$Y_0$>>2]). A second input ([$Km_0$], [$Km_2$]) 2302 is provided to a second adder 2310B. The output of the second adder 2310B is provided to the third adder 2310C and the fourth adder 2310D. A third input 2303 ([$Km_1$], [$Km_1$<<1]) is provided to the third through sixth adder 2310C-2310F, with input element [$Km_1$] provided to the third and fourth adder 2310C-2310D and input element [$Km_1$<<1] provided to the fifth and sixth adder 2310E-2310C. The third adder 2310C outputs a second intermediate value $Y_1$, which is transformed into a second output element 2322 ([$K'_1$=$Y_1$>>1]). The fourth adder 2310D outputs a third intermediate value $Y_2$, which is transformed into a third output element 2323 ([$K'_2$=$Y_2$>>1]). The fifth adder 2310E outputs a third intermediate value $Y_3$, which is transformed into a fourth output element 2325 ([$K'_3$=$Y_3$>>3]). The sixth adder 2310F outputs a fourth intermediate value $Y_4$, which is transformed into a fifth output element 2325 ([$K'_4$=$Y_4$>>3]). The fifth adder 2310E and sixth adder 2310F receive output from the seventh adder 2310G, the seventh adder receiving a fourth input 2304 ([$Km_0$], [$Km_2$<<2]). A fifth input 2305 ([$Km_2$], [$Km_2$<<1]) is provided to the eight adder 2310H, which generates a fifth intermediate output $Y_5$, which is used, without transform, as the sixth output 2326 ([$K'_5$=$Y_5$]).

Described above, in various embodiments, is a hardware-based Winograd convolution acceleration architecture that enables a single Winograd transform method (e.g., F(4,3)) to be applied to kernels of multiple sizes and strides. The Winograd acceleration architecture includes a Winograd controller that exercises fine-grain control of Winograd processing elements to enable the Winograd convolution using multiple kernel sizes. The Winograd acceleration architecture also includes steering write logic that enables Winograd convolution for multiple different kernel strides. Shared input and output transform units within the Winograd acceleration architecture allow the transform cost to be amortized over a large number of parallel compute operations, reducing the hardware complexity, power, and area requirements to implement hardware accelerated Winograd convolution.

Additional optimizations are described that enable reduced power/area weight transformation for use during a Winograd transform. The optimized weight transform performs a two-phase transform including an offline portion and an on-line transform performed in-line with the Winograd compute operations. The optimized weight transform techniques allow a Winograd convolution accelerator to be implemented with reduced power and area requirements suitable for neural network inference accelerators.

Software and Firmware Implemented Optimizations

The hardware design elements described herein can also be implemented using software or firmware techniques to sequence compute operations on a Winograd accelerator having support for a single kernel size and kernel stride. Firmware executing on a microcontroller, such as a graphics microcontroller, can perform operations according to a process illustrated in FIG. 24.

Figure 24:
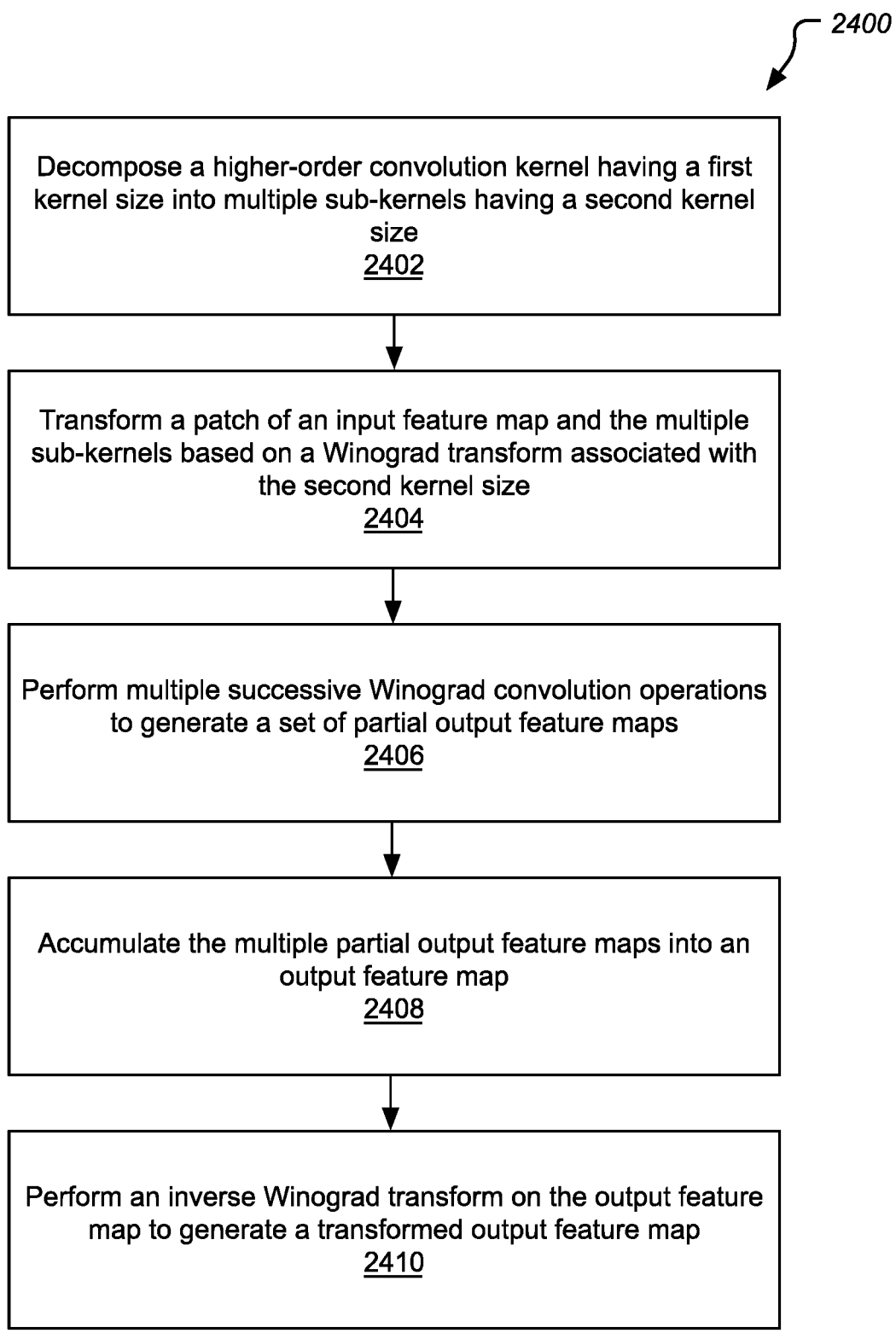
FIG. 24 illustrates a process to perform hardware-based Winograd convolution using kernels of multiple sizes, according to embodiments described herein.

As shown in FIG. 24, a process 2400 to perform hardware-based Winograd convolution using kernels of multiple sizes, according to embodiments described herein, includes to decompose a higher-order convolution kernel having a first kernel size into multiple sub-kernels having a second kernel size, as shown at block 2402, and transform at least a patch of an input feature map and the multiple sub-kernels based on a Winograd transform associated with the second kernel size, as shown at block 2404. The process 2400 additionally includes to perform multiple successive Winograd convolution operations to generate a set of partial output feature maps as shown at block 2406, and accumulate the multiple partial output feature maps into an output feature map, as shown at block 2408. The process 2400 additionally includes to perform an inverse Winograd transform on the output feature map to generate a transformed output feature map, as shown at block 2410.

Multi-stride Winograd convolution can be implemented by parsing and packing kernel and feature map data and contiguously storing the kernel and feature map data into buffers based on the specified kernel stride of the convolution. An exemplary process is illustrated in FIG. 25.

Figure 25:
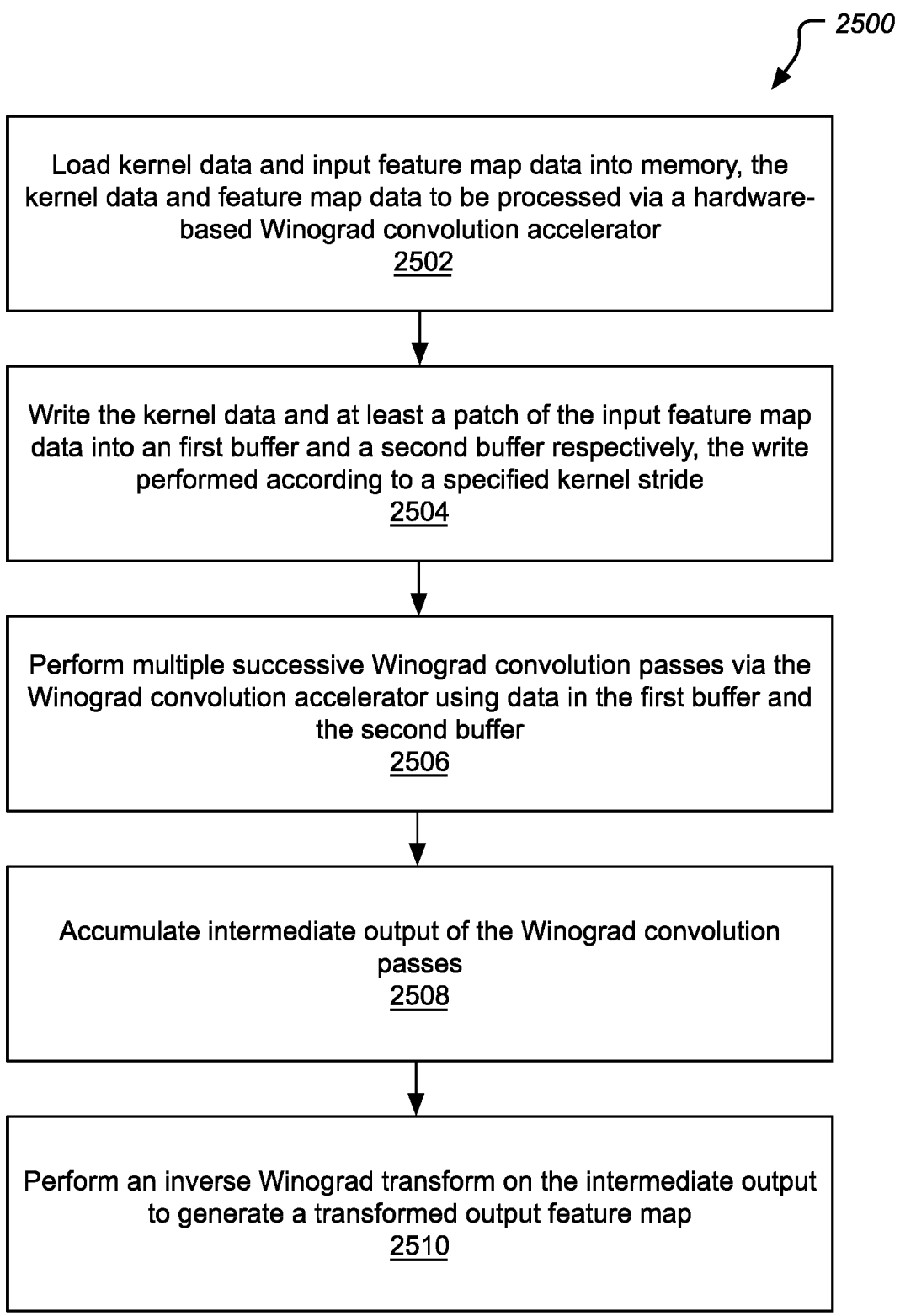
FIG. 25 illustrates a process to perform hardware-based Winograd convolution using kernels of multiple strides, according to embodiments described herein.

As shown in FIG. 25, a process 2500 to perform hardware-based Winograd convolution using kernels of multiple strides, according to embodiments described herein, includes to load kernel data and input feature map data into memory (e.g., system memory), where the kernel data and feature map data to be processed via a hardware-based Winograd convolution accelerator, as shown at block 2502. Software, firmware, or hardware logic can then write the kernel data and at least a patch of the input feature map data into a first (e.g., kernel) buffer and a second (e.g., input) buffer, the write performed using steering write logic to pack multiple portions of the input buffer and kernel buffer according to a specified kernel stride, as shown at block 2504. Multiple Winograd convolution passes can then be performed using data in the first buffer and the second buffer, as shown at block 2506. Intermediate output of the convolution passes can be accumulated at block 2508 before an inverse Winograd transformation is performed on the intermediate output to generate a transformed output feature map at bock 2510.

Optimized kernel weight transformation can also be implemented in software or firmware of a data processing system, in an independent manner from the other techniques described herein. For example, the weight transformation operations for a Winograd kernel transform can be divided into multiple phases, including one or more offline transform phases and an online transform that is performed in-line with the Winograd compute operations. The one or more offline transformations perform operations that are computationally more expensive to implement in hardware relative to the online portion of the transform.

Figure 26:
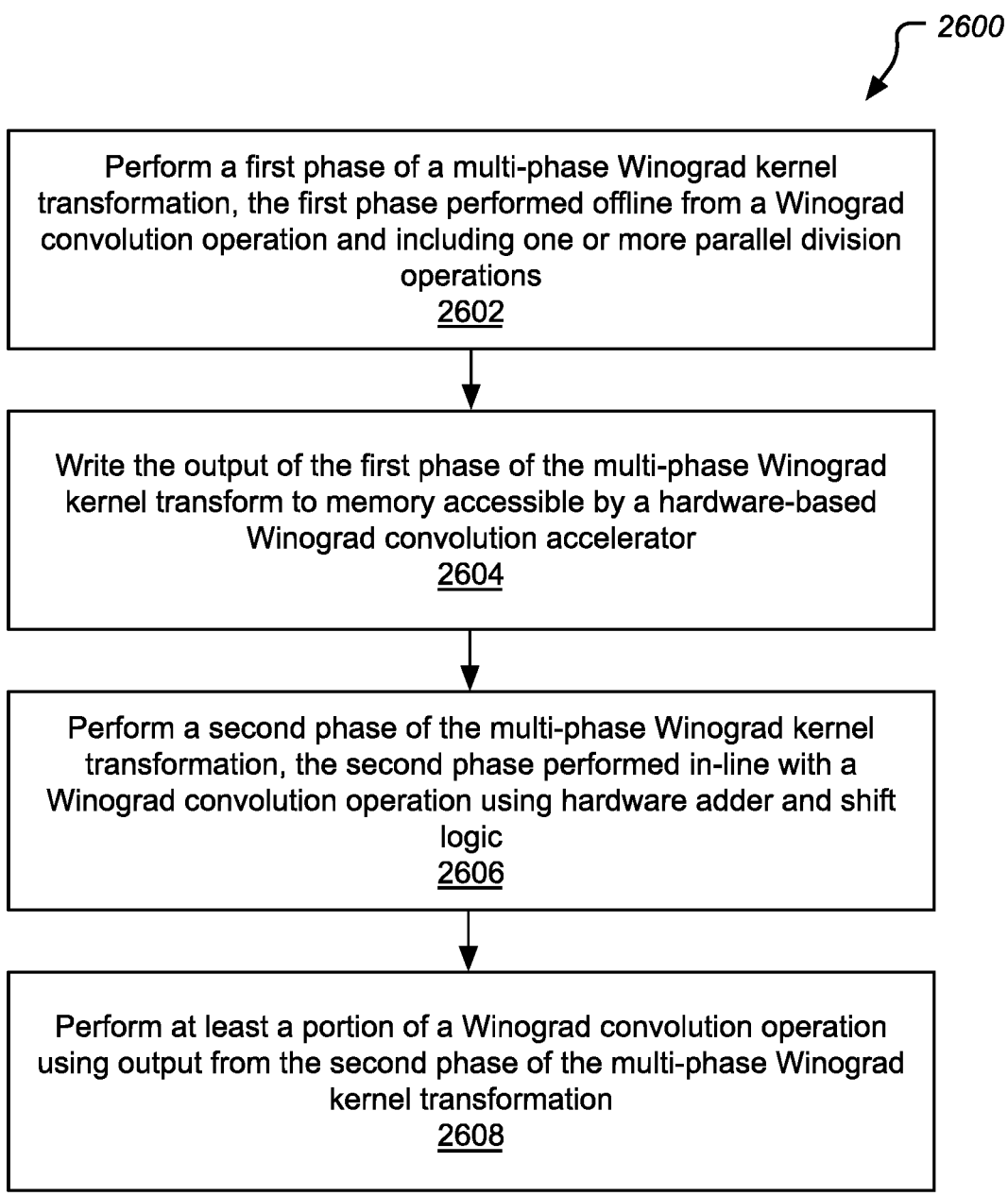
FIG. 26 illustrates a process to perform optimized weight transformation for hardware-based Winograd convolution, according to embodiments described herein.

In one embodiment, as shown in process 2600 of FIG. 26, a first (e.g., offline) phase of the optimized Winograd kernel weight transformation can be performed, where the first phase includes one or more parallel division operations on weight data to be transformed, as shown at block 2602. The process 2600 additionally includes to write the output of the first phase of the multi-phase Winograd kernel transformation to memory that is accessible by a hardware-based Winograd convolution accelerator, as shown at block 2604. The process 2600 additionally includes to perform a second phase of the multi-phase Winograd kernel transformation in-line with a Winograd convolution operation using hardware adder and shift logic, as shown at block 2606. The process 2600 additionally includes to perform at least a portion of a Winograd convolution operation using output from the second phase of the multi-phase Winograd kernel transformation, as shown at block 2608.

The second, online phase of the Winograd kernel transformation can be performed using only adders and shifters, which are simpler to implement in hardware relative to divisor logic that is required for use by the first phase. The offline phase can be performed by general purpose computation hardware in response to instructions provided by software or firmware. For example, a machine learning framework can perform the division operations on the weight data before the weight data is provide to a Winograd convolution accelerator, which can perform the online transformation portion in-line with the Winograd convolution. Further optimization can be performed in the hardware portion of the weight transformation logic that performs the online weight transforms. The hardware weight transformation logic can be configured such that multiple adders are shared between multiple inputs, and one or more of the shared adders are used to generate multiple transformed kernel elements.

Machine Learning Overview

A machine learning algorithm is an algorithm that can learn based on a set of data. Embodiments of machine learning algorithms can be designed to model high-level abstractions within a data set. For example, image recognition algorithms can be used to determine which of several categories to which a given input belong; regression algorithms can output a numerical value given an input; and pattern recognition algorithms can be used to generate translated text or perform text to speech and/or speech recognition.

An exemplary type of machine learning algorithm is a neural network. There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 27:
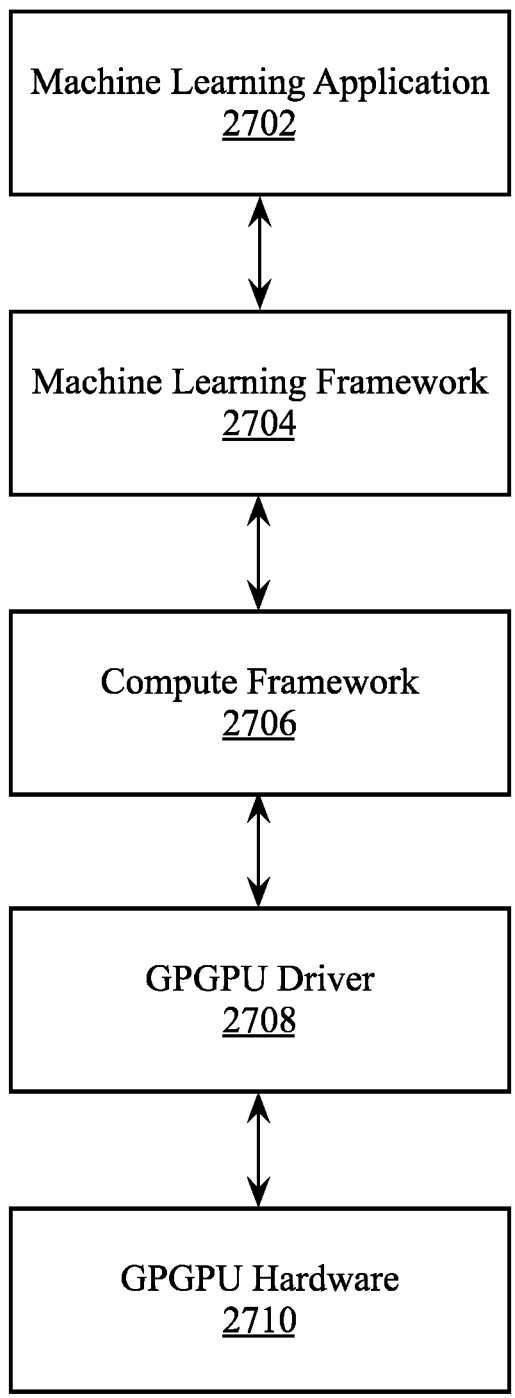
FIG. 27 illustrates a machine learning software stack, according to an embodiment.

FIG. 27 is a generalized diagram of a machine learning software stack 2700. A machine learning application 2702 can be configured to train a neural network using a training dataset or to use a trained deep neural network to implement machine intelligence. The machine learning application 2702 can include training and inference functionality for a neural network and/or specialized software that can be used to train a neural network before deployment. The machine learning application 2702 can implement any type of machine intelligence including but not limited to image recognition, mapping and localization, autonomous navigation, speech synthesis, medical imaging, or language translation.

Hardware acceleration for the machine learning application 2702 can be enabled via a machine learning framework 2704. The machine learning framework 2704 can provide a library of machine learning primitives. Machine learning primitives are basic operations that are commonly performed by machine learning algorithms. Without the machine learning framework 2704, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 2704. Exemplary primitives include tensor convolutions, activation functions, and pooling, which are computational operations that are performed while training a convolutional neural network (CNN). The machine learning framework 2704 can also provide primitives to implement basic linear algebra subprograms performed by many machine-learning algorithms, such as matrix and vector operations.

The machine learning framework 2704 can process input data received from the machine learning application 2702 and generate the appropriate input to a compute framework 2706. The compute framework 2706 can abstract the underlying instructions provided to the GPGPU driver 2708 to enable the machine learning framework 2704 to take advantage of hardware acceleration via the GPGPU hardware 2710 without requiring the machine learning framework 2704 to have intimate knowledge of the architecture of the GPGPU hardware 2710. Additionally, the compute framework 2706 can enable hardware acceleration for the machine learning framework 2704 across a variety of types and generations of the GPGPU hardware 2710.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is well-known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 28A:
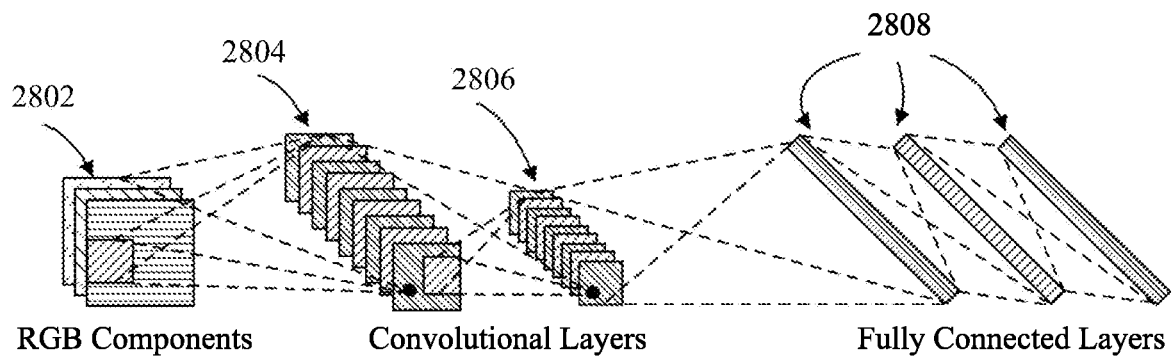
FIG. 28A-28B illustrate layers of exemplary deep neural networks.
Figure 28B:
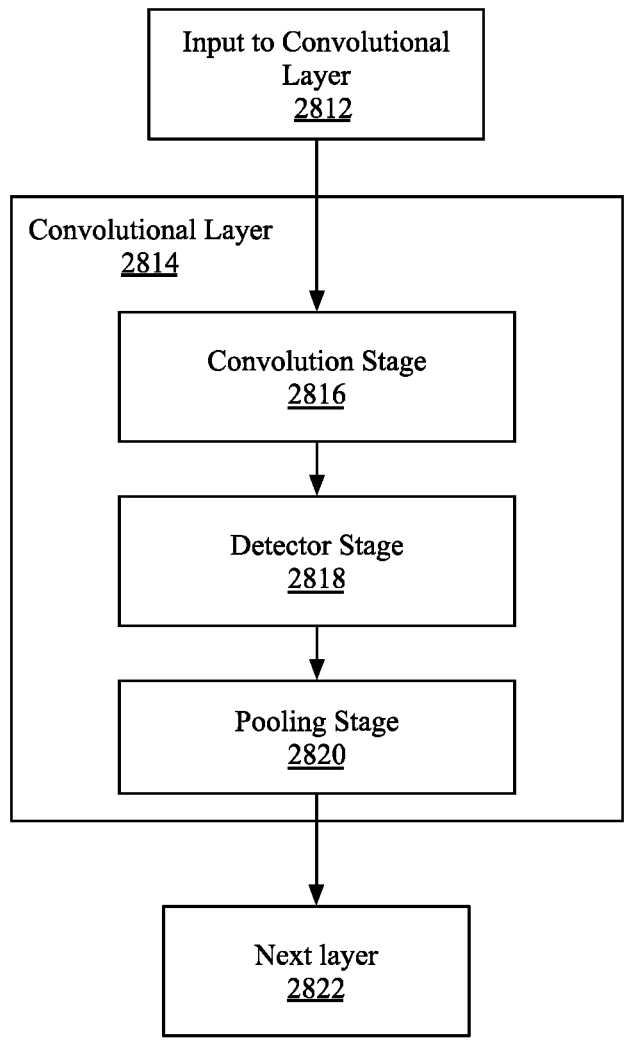

FIG. 28A-28B illustrate an exemplary convolutional neural network. FIG. 28A illustrates various layers within a CNN. As shown in FIG. 28A, an exemplary CNN used to model image processing can receive input 2802 describing the red, green, and blue (RGB) components of an input image. The input 2802 can be processed by multiple convolutional layers (e.g., convolutional layer 2804, convolutional layer 2806). The output from the multiple convolutional layers may optionally be processed by a set of fully connected layers 2808. Neurons in a fully connected layer have full connections to all activations in the previous layer, as previously described for a feedforward network. The output from the fully connected layers 2808 can be used to generate an output result from the network. The activations within the fully connected layers 2808 can be computed using matrix multiplication instead of convolution. Not all CNN implementations are make use of fully connected layers DPLA08. For example, in some implementations the convolutional layer 2806 can generate output for the CNN.

The convolutional layers are sparsely connected, which differs from traditional neural network configuration found in the fully connected layers 2808. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 28B illustrates exemplary computation stages within a convolutional layer of a CNN. Input to a convolutional layer 2812 of a CNN can be processed in three stages of a convolutional layer 2814. The three stages can include a convolution stage 2816, a detector stage 2818, and a pooling stage 2820. The convolution layer 2814 can then output data to a successive convolutional layer. The final convolutional layer of the network can generate output feature map data or provide input to a fully connected layer, for example, to generate a classification value for the input to the CNN.

In the convolution stage 2816 performs several convolutions in parallel to produce a set of linear activations. The convolution stage 2816 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 2816 defines a set of linear activations that are processed by successive stages of the convolutional layer 2814.

The linear activations can be processed by a detector stage 2818. In the detector stage 2818, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=\max(0, x)$, such that the activation is thresholded at zero.

The pooling stage 2820 uses a pooling function that replaces the output of the convolutional layer 2806 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 2820, including max pooling, average pooling, and 12-norm pooling. Additionally, some CNN implementations do not include a pooling stage. Instead, such implementations substitute and additional convolution stage having an increased stride relative to previous convolution stages.

The output from the convolutional layer 2814 can then be processed by the next layer 2822. The next layer 2822 can be an additional convolutional layer or one of the fully connected layers 2808. For example, the first convolutional layer 2804 of FIG. 28A can output to the second convolutional layer 2806, while the second convolutional layer can output to a first layer of the fully connected layers 2808.

Figure 29:
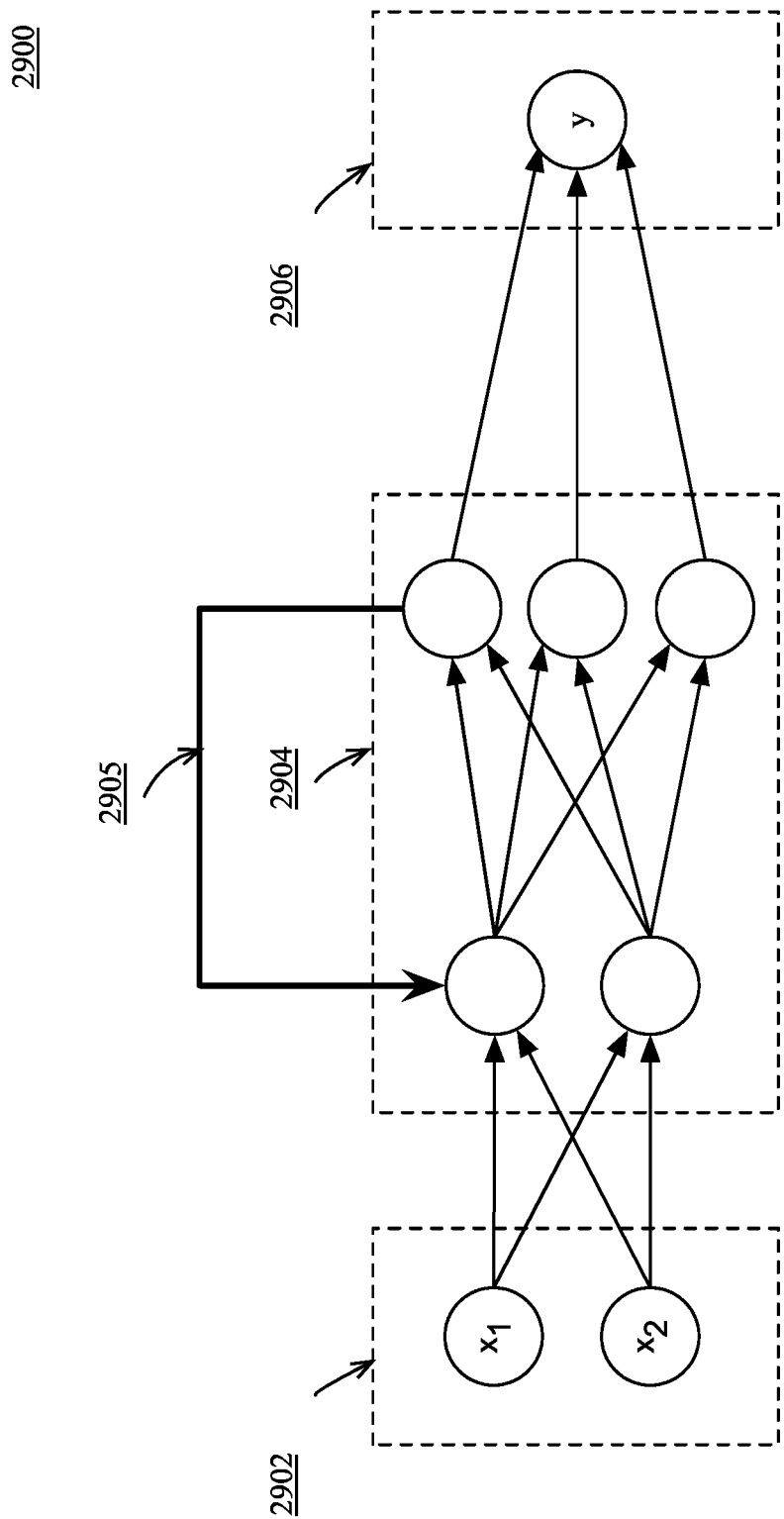
FIG. 29 illustrates an exemplary recurrent neural network.

FIG. 29 illustrates an exemplary recurrent neural network 2900. In a recurrent neural network (RNN), the previous state of the network influences the output of the current state of the network. RNNs can be built in a variety of ways using a variety of functions. The use of RNNs generally revolves around using mathematical models to predict the future based on a prior sequence of inputs. For example, an RNN may be used to perform statistical language modeling to predict an upcoming word given a previous sequence of words. The illustrated RNN 2900 can be described has having an input layer 2902 that receives an input vector, hidden layers 2904 to implement a recurrent function, a feedback mechanism 2905 to enable a 'memory' of previous states, and an output layer 2906 to output a result. The RNN 2900 operates based on time-steps. The state of the RNN at a given time step is influenced based on the previous time step via the feedback mechanism 2905. For a given time step, the state of the hidden layers 2904 is defined by the previous state and the input at the current time step. An initial input ($x_1$) at a first time step can be processed by the hidden layer 2904. A second input ($x_2$) can be processed by the hidden layer 2904 using state information that is determined during the processing of the initial input ($x_1$). A given state can be computed as $s_t = f(Ux_t + Ws_{t-1})$, where U and W are parameter matrices. The function $f$ is generally a non-linearity, such as the hyperbolic tangent function (Tan h) or a variant of the rectifier function $f(x) = \max(0, x)$. However, the specific mathematical function used in the hidden layers 2904 can vary depending on the specific implementation details of the RNN 2900.

In addition to the basic CNN and RNN networks described, variations on those networks may be enabled. One example RNN variant is the long short term memory (LSTM) RNN. LSTM RNNs are capable of learning long-term dependencies that may be necessary for processing longer sequences of language. A variant on the CNN is a convolutional deep belief network, which has a structure similar to a CNN and is trained in a manner similar to a deep belief network. A deep belief network (DBN) is a generative neural network that is composed of multiple layers of stochastic (random) variables. DBNs can be trained layer-by-layer using greedy unsupervised learning. The learned weights of the DBN can then be used to provide pre-train neural networks by determining an optimal initial set of weights for the neural network.

Figure 30:
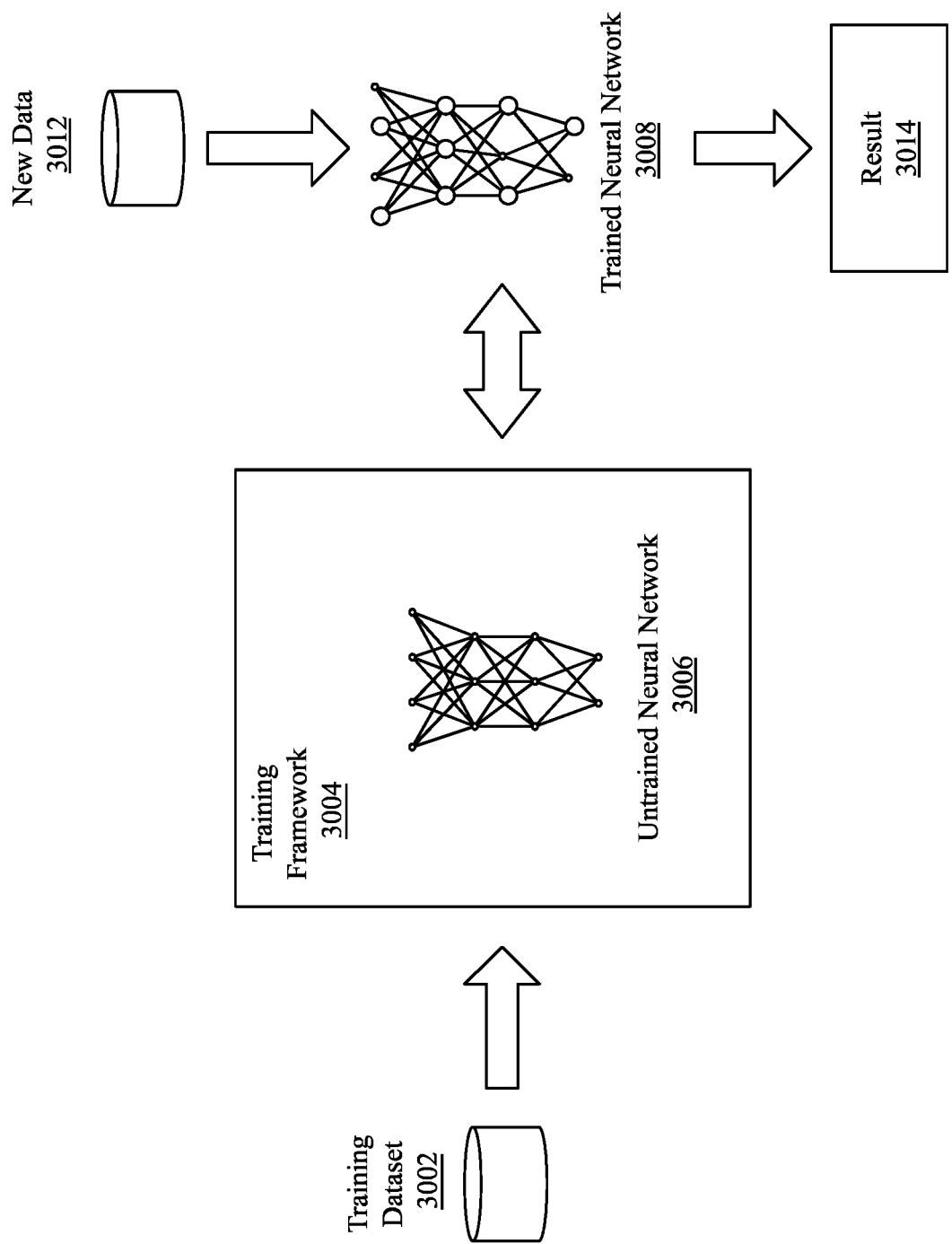
FIG. 30 illustrates training and deployment of a deep neural network.

FIG. 30 illustrates training and deployment of a deep neural network. Once a given network has been structured for a task the neural network is trained using a training dataset 3002. Various training frameworks 3004 have been developed to enable hardware acceleration of the training process. For example, the machine learning framework 2704 of FIG. 27 may be configured as a training framework 2704. The training framework 2704 can hook into an untrained neural network 3006 and enable the untrained neural net to be trained using the parallel processing resources described herein to generate a trained neural net 3008.

To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 3002 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 3004 can adjust to adjust the weights that control the untrained neural network 3006. The training framework 3004 can provide tools to monitor how well the untrained neural network 3006 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural net 3008. The trained neural network 3008 can then be deployed to implement any number of machine learning operations.

Unsupervised learning is a learning method in which the network attempts to train itself using unlabeled data. Thus, for unsupervised learning the training dataset 3002 will include input data without any associated output data. The untrained neural network 3006 can learn groupings within the unlabeled input and can determine how individual inputs are related to the overall dataset. Unsupervised training can be used to generate a self-organizing map, which is a type of trained neural network 3007 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 3002 includes a mix of labeled and unlabeled data of the same distribution. Incremental learning is a variant of supervised learning in which input data is continuously used to further train the model. Incremental learning enables the trained neural network 3008 to adapt to the new data 3012 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

Figure 31:
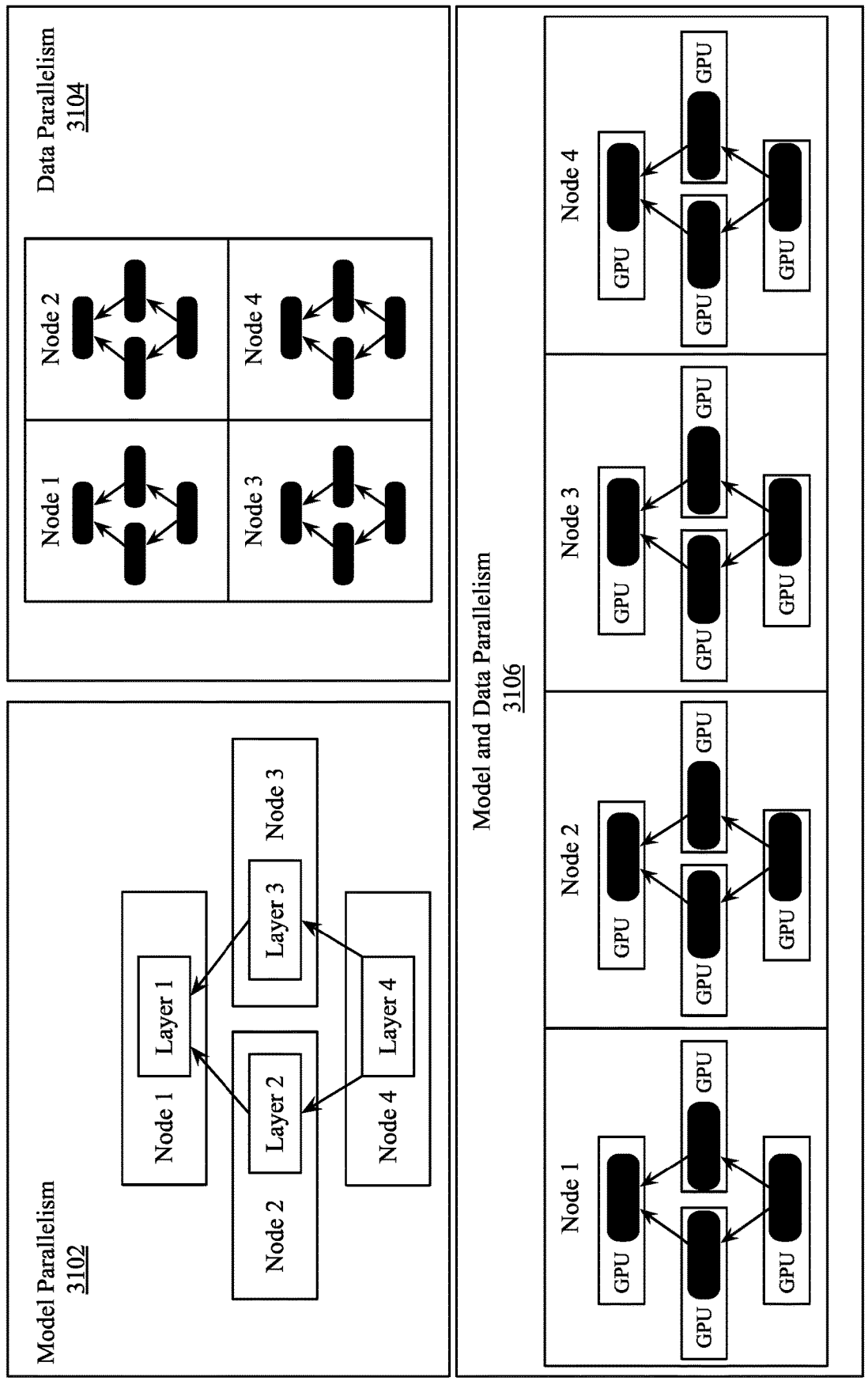
FIG. 31 is a block diagram illustrating distributed learning.

FIG. 31 is a block diagram illustrating distributed learning. Distributed learning is a training model that uses multiple distributed computing nodes to perform supervised or unsupervised training of a neural network. The distributed computational nodes can each include one or more host processors and one or more of the general-purpose processing nodes, such as the highly-parallel general-purpose graphics processing unit 2800 as in FIG. 2800. As illustrated, distributed learning can be performed model parallelism 3102, data parallelism 3104, or a combination of model and data parallelism 3104.

In model parallelism 3102, different computational nodes in a distributed system can perform training computations for different parts of a single network. For example, each layer of a neural network can be trained by a different processing node of the distributed system. The benefits of model parallelism include the ability to scale to particularly large models. Splitting the computations associated with different layers of the neural network enables the training of very large neural networks in which the weights of all layers would not fit into the memory of a single computational node. In some instances, model parallelism can be particularly useful in performing unsupervised training of large neural networks.

In data parallelism 3104, the different nodes of the distributed network have a complete instance of the model and each node receives a different portion of the data. The results from the different nodes are then combined. While different approaches to data parallelism are possible, data parallel training approaches all require a technique of combining results and synchronizing the model parameters between each node. Exemplary approaches to combining data include parameter averaging and update based data parallelism. Parameter averaging trains each node on a subset of the training data and sets the global parameters (e.g., weights, biases) to the average of the parameters from each node. Parameter averaging uses a central parameter server that maintains the parameter data. Update based data parallelism is similar to parameter averaging except that instead of transferring parameters from the nodes to the parameter server, the updates to the model are transferred. Additionally, update based data parallelism can be performed in a decentralized manner, where the updates are compressed and transferred between nodes.

Combined model and data parallelism 3106 can be implemented, for example, in a distributed system in which each computational node includes multiple GPUs. Each node can have a complete instance of the model with separate GPUs within each node are used to train different portions of the model.

Distributed training has increased overhead relative to training on a single machine. However, the parallel processors and GPGPUs described herein can each implement various techniques to reduce the overhead of distributed training, including techniques to enable high bandwidth GPU-to-GPU data transfer and accelerated remote data synchronization.

Exemplary Machine Learning Applications

Machine learning can be applied to solve a variety of technological problems, including but not limited to computer vision, autonomous driving and navigation, speech recognition, and language processing. Computer vision has traditionally been one of the most active research areas for machine learning applications. Applications of computer vision range from reproducing human visual abilities, such as recognizing faces, to creating new categories of visual abilities. For example, computer vision applications can be configured to recognize sound waves from the vibrations induced in objects visible in a video. Parallel processor accelerated machine learning enables computer vision applications to be trained using significantly larger training dataset than previously feasible and enables inferencing systems to be deployed using low power parallel processors.

Parallel processor accelerated machine learning has autonomous driving applications including lane and road sign recognition, obstacle avoidance, navigation, and driving control. Accelerated machine learning techniques can be used to train driving models based on datasets that define the appropriate responses to specific training input. The parallel processors described herein can enable rapid training of the increasingly complex neural networks used for autonomous driving solutions and enables the deployment of low power inferencing processors in a mobile platform suitable for integration into autonomous vehicles.

Parallel processor accelerated deep neural networks have enabled machine learning approaches to automatic speech recognition (ASR). ASR includes the creation of a function that computes the most probable linguistic sequence given an input acoustic sequence. Accelerated machine learning using deep neural networks have enabled the replacement of the hidden Markov models (HMMs) and Gaussian mixture models (GMMs) previously used for ASR.

Parallel processor accelerated machine learning can also be used to accelerate natural language processing. Automatic learning procedures can make use of statistical inference algorithms to produce models that are robust to erroneous or unfamiliar input. Exemplary natural language processor applications include automatic machine translation between human languages.

The parallel processing platforms used for machine learning can be divided into training platforms and deployment platforms. Training platforms are generally highly parallel and include optimizations to accelerate multi-GPU single node training and multi-node, multi-GPU training. Exemplary parallel processors suited for training include the highly-parallel general-purpose graphics processing unit 2800 of FIG. 2800 and the multi-GPU computing system 2900 of FIG. 2900. On the contrary, deployed machine learning platforms generally include lower power parallel processors suitable for use in products such as cameras, autonomous robots, and autonomous vehicles.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Various components can be a means for performing the operations or functions described.

One embodiment provides a compute apparatus to perform machine learning operations, the compute apparatus comprising a hardware accelerator including a compute unit to perform a Winograd convolution, the compute unit configurable to perform the Winograd convolution for a first kernel size using a transform associated with a second kernel size.

In one embodiment the hardware accelerator includes a register to store a value for the second kernel size, the second kernel size configurable via an interface to the register, the interface to the register provided by the hardware accelerator. The hardware accelerator can include a control unit to provide an instruction to the compute unit, the instruction to cause the compute unit to perform a Winograd convolution operation based on the value for the second kernel size. In one embodiment the hardware accelerator includes steering write logic to enable Winograd convolution for multiple different kernel strides. In one embodiment the compute unit is configurable to perform the Winograd convolution for a first kernel stride using a transform associated with a second kernel stride. In one embodiment the hardware accelerator including a register to store a value of the second kernel stride and the steering write logic is to write input data and kernel data to memory within the hardware accelerator according to the value of the second kernel stride.

In one embodiment the hardware accelerator includes multiple tiles of compute logic, each tile including multiple compute units. Each of the multiple tiles of compute logic can include a weight transform unit to apply a Winograd transform to weights associated with a convolution kernel and store transformed weights to a memory coupled with the weight transform unit. The transformed weights can be stored to the memory that is coupled with the weight transform unit shared among the multiple compute units within the tile of compute logic including the weight transform unit and the memory coupled with the weight transform unit. In one embodiment the hardware accelerator includes an input transform unit configured to apply a Winograd transform to input feature map data, the input transform unit shared between the multiple tiles of compute logic.

One embodiment provides for a method of performing machine learning operations, the method comprising decomposing a convolution kernel having a first kernel size into multiple sub-kernels having a second kernel size; transforming a portion of an input feature map and the multiple sub-kernels based on a Winograd transform, the Winograd transform associated with the second kernel size; and performing multiple successive Winograd convolution operations to generate a set of partial output feature maps.

In one embodiment the method additionally includes accumulating multiple partial output feature maps into an output feature map; and performing an inverse Winograd transform on the output feature map to generate a transformed output feature map. In one embodiment, performing the multiple successive Winograd convolution operations to generate a set of partial output feature maps includes loading kernel data and input feature map data into memory, the kernel data and input feature map data to be processed via a hardware-based Winograd convolution accelerator; writing the kernel data to a first hardware buffer; writing at least a portion of the input feature map data into a second hardware buffer; performing multiple successive Winograd convolution passes via the hardware-based Winograd convolution accelerator using data in the first hardware buffer and the second hardware buffer; accumulating intermediate output of the multiple successive Winograd convolution passes; and performing an inverse Winograd transform on the intermediate output to generate a transformed output feature map.

In one embodiment, transforming a portion of a sub-kernel based on a Winograd transform includes performing a first phase of a multi-phase Winograd kernel transformation, the first phase including one or more parallel division operations; and performing a second phase of the multi-phase Winograd kernel transformation, the second phase performed in-line with a Winograd convolution operation using hardware adder and shift logic. In one embodiment the method additionally includes performing at least a portion of a Winograd convolution operation using output from the second phase of the multi-phase Winograd kernel transformation.

One embodiment provides for a data processing system comprising a non-transitory machine-readable medium to store instructions for execution by one or more processors of the data processing system and a general-purpose graphics processing unit including a hardware accelerator including a compute unit to perform a Winograd convolution, the compute unit configurable to perform the Winograd convolution for a first kernel size using a transform associated with a second kernel size. The compute unit of the data processing system can perform any of the Winograd convolution operations otherwise described herein.

The embodiments described herein refer to specific configurations of hardware, such as application specific integrated circuits (ASICs), configured to perform certain operations or having a predetermined functionality. Embodiments described herein may also be incorporated into hardware products such as, but not limited to, FPGA, CPU, or GPU based computer vision accelerators. The hardware and/or software techniques can be applied to various Internet of things (IoT) solutions including autonomous driving, autonomous robots, and computer vision systems for augmented reality and/or virtual reality. Such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage devices of a given electronic device typically store code and/or data for execution on the set of one or more processors of that electronic device. Furthermore, some elements may be incorporated into software-based machine learning acceleration frameworks.

Of course, one or more parts of an embodiment may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the embodiments may be practiced without some of these specific details. In certain instances, well-known structures and functions were not described in elaborate detail to avoid obscuring the inventive subject matter of the embodiments. Accordingly, the scope and spirit of the invention should be judged in terms of the claims that follow.

What is claimed is:

1. An apparatus to perform machine learning operations, the apparatus comprising:
    a hardware accelerator to perform a Winograd convolution for a first kernel size using a Winograd transform associated with a second kernel size;
    the hardware accelerator including a register to store a value for the second kernel size, the second kernel size configurable via an interface to the register, the interface to the register provided by the hardware accelerator.

2. The apparatus as in claim 1, the hardware accelerator to perform the Winograd convolution operation based on the value for the second kernel size.

3. The apparatus as in claim 2, the hardware accelerator to enable the Winograd convolution for multiple different kernel strides.

4. The apparatus as in claim 3, the hardware accelerator to perform the Winograd convolution for a first kernel stride using a transform associated with a second kernel stride.

5. The apparatus as in claim 4, the hardware accelerator including a register to store a value of the second kernel stride, and the hardware accelerator to write input data and kernel data to memory within the hardware accelerator according to the value of the second kernel stride.

6. The apparatus as in claim 1, the hardware accelerator including multiple tiles of compute logic, each tile including multiple compute units, each of the multiple tiles of compute logic including a weight transform unit, the hardware accelerator to apply, via the weight transform unit, a Winograd transform to weights associated with a convolution kernel and store transformed weights to a memory.

7. A data processing system comprising:
 a non-transitory machine-readable medium to store instructions for execution by one or more processors of the data processing system; and
 a general-purpose graphics processing unit including a hardware accelerator to perform a Winograd convolution for a first kernel size using a Winograd transform associated with a second kernel size;
 the hardware accelerator including a register to store a value for the second kernel size, the second kernel size configurable via an interface to the register, the interface to the register provided by the hardware accelerator.

8. The data processing system as in claim 7, the hardware accelerator to perform the Winograd convolution operation based on the value for the second kernel size.

9. The data processing system as in claim 8, the hardware accelerator to enable the Winograd convolution for multiple different kernel strides.

10. The data processing system as in claim 9, the hardware accelerator to perform the Winograd convolution for a first kernel stride using a transform associated with a second kernel stride.

11. A method comprising:
 performing, by a hardware accelerator of a computing device, a Winograd convolution for a first kernel size using a Winograd transform associated with a second kernel size; and
 storing, by a register of the hardware accelerator, a value for the second kernel size, the second kernel size configurable via an interface to the register, the interface to the register provided by the hardware accelerator.

12. The method of claim 11, further comprising performing, by the hardware accelerator, the Winograd convolution operation based on the value for the second kernel size.

13. The method of claim 11, further comprising enabling, by the hardware accelerator, the Winograd convolution for multiple different kernel strides.

14. The method of claim 11, further comprising performing, by the hardware accelerator, the Winograd convolution for a first kernel stride using a transform associated with a second kernel stride.

15. A non-transitory machine-readable medium having stored thereon instructions which, when executed by a machine, cause the machine to perform operations comprising:
 performing, by a hardware accelerator of the machine, a Winograd convolution for a first kernel size using a Winograd transform associated with a second kernel size; and
 storing, by a register of the hardware accelerator, a value for the second kernel size, the second kernel size configurable via an interface to the register, the interface to the register provided by the hardware accelerator.

16. The non-transitory machine-readable medium of claim 15, the operations further comprise performing, by the hardware accelerator, the Winograd convolution operation based on the value for the second kernel size.

17. The non-transitory machine-readable medium of claim 15, the operations further comprise enabling, by the hardware accelerator, the Winograd convolution for multiple different kernel strides.

18. The non-transitory machine-readable medium of claim 15, the operations further comprise performing, by the hardware accelerator, the Winograd convolution for a first kernel stride using a transform associated with a second kernel stride.

* * * * *